United States Patent
Hurd et al.

(10) Patent No.: US 10,435,611 B2
(45) Date of Patent: Oct. 8, 2019

(54) METHODS FOR PRODUCING EMULSIFIERS FOR OIL-BASED DRILLING FLUIDS

(71) Applicant: Ingevity South Carolina, LLC, North Charleston, SC (US)

(72) Inventors: Phillip W. Hurd, Conyers, GA (US); John B. Hines, Atlanta, GA (US); Roger Scott Johnson, Lilburn, GA (US); David T. Mpofu, Dunwoody, GA (US); Nathan P. Rife, Sugar Land, TX (US); Anne M. Cothran, Conyers, GA (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 15/871,986

(22) Filed: Jan. 16, 2018

(65) Prior Publication Data

US 2018/0134940 A1    May 17, 2018

Related U.S. Application Data

(63) Continuation of application No. 14/461,460, filed on Aug. 18, 2014, now Pat. No. 9,868,891.

(60) Provisional application No. 61/867,328, filed on Aug. 19, 2013.

(51) Int. Cl.
   *C09K 8/36*    (2006.01)

(52) U.S. Cl.
   CPC .................................... *C09K 8/36* (2013.01)

(58) Field of Classification Search
   None
   See application file for complete search history.

(56) References Cited

U.S. PATENT DOCUMENTS

| 3,169,113 A * | 2/1965 | Kirkpatrick .............. C09K 8/64 507/240 |
| 2003/0130135 A1 | 7/2003 | Hou et al. |
| 2007/0066796 A1 | 3/2007 | Cravey et al. |
| 2007/0167333 A1 * | 7/2007 | Hurd ..................... B01F 17/005 507/244 |
| 2013/0079258 A1 | 3/2013 | Hurd et al. |

FOREIGN PATENT DOCUMENTS

| CA | 716033 | 8/1965 |
| WO | WO 1989/011516 A1 | 11/1989 |
| WO | WO 1999/033944 A1 | 7/1999 |

OTHER PUBLICATIONS

International Search Report and Written Opnion for PCT/US2014/051411, dated Nov. 24, 2014.
Extended Eruopean Search Report for EP 18195221.9, dated Dec. 19, 2018.
International Preliminary Report on Patentability for PCT/US204/051411, dated Feb. 23, 2016.

* cited by examiner

*Primary Examiner* — Jeffrey D Washville
(74) *Attorney, Agent, or Firm* — Bryan D. Zerhusen, Esq.; Cantor Colburn LLP

(57) ABSTRACT

Methods for making emulsifiers, emulsified drilling fluids, and methods for using the same are provided. In one or more embodiments, the method for making an emulsifier can include mixing a tall oil and a triamide. The triamide can have the chemical formula:

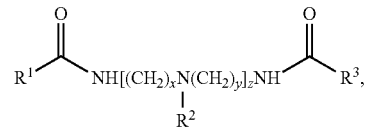

where:
  x, y, and z are integers independently selected from 1 to 10,
  $R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl,
  $R^2$ is H or

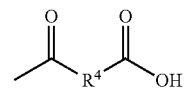

independently selected for each $[(CH_2)_xNR^2(CH_2)_y]$ unit, where $R^4$ is a $C_1$-$C_3$ alkylene or a $C_1$-$C_3$ alkylene alcohol, and where at least one $R^2$ is

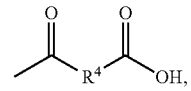

and
  $R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

20 Claims, No Drawings

METHODS FOR PRODUCING EMULSIFIERS FOR OIL-BASED DRILLING FLUIDS

CROSS-REFERENCE TO RELATED APPLICATION

This application is a continuation of co-pending U.S. patent application Ser. No. 14/461,460, filed on Aug. 18, 2014, which claims priority to U.S. Provisional Patent Application No. 61/867,328, filed Aug. 19, 2013, which are both incorporated by reference herein.

BACKGROUND

Field

Embodiments described generally relate to methods for making emulsifiers that can include one or more tall oils and one or more triamides, emulsified drilling fluids, and methods for using same.

Description of the Related Art

The oil and gas industry has used drilling fluids or "drilling muds" for a number of years to tap subterranean deposits of natural resources. As the total reserves of oil diminish, it has become necessary to drill in areas that were previously inaccessible due to technological or economic difficulties. This has led to the widespread use of oil-based drilling fluids or invert emulsion drilling fluids, which offer greater thermal and chemical stability than water-based fluids, allowing for drilling at extended depths and in other demanding services, such as those involving exposure to high electrolyte concentrations and soluble gases. For example, invert emulsion drilling fluids have been used successfully in drilling hot (e.g., greater than 150° C.) formations as well as those containing hydrogen sulfide. Also, to maximize recovery from each platform in offshore drilling, invert emulsion drilling fluids are favored due to their effectiveness for drilling deviated wells (e.g., angled wells). In particular, the high lubricity of invert emulsion drilling fluids is necessary because of the increased torque exerted on the drill string in deviated drilling.

Invert emulsion drilling fluids are typically formed by blending a hydrocarbon oil with water or brine under high shear conditions and in the presence of a suitable emulsifier. The emulsifier is required not only to form a stable dispersion of water droplets in the oil phase, but also to maintain any solids such as weighting material additives (e.g., barites) or drill cuttings in an oil-wet state. With space at some well sites limited, such as on offshore platforms, and with increasing costs of transport of materials to a well site, there is industry wide interest particularly in drilling fluid compositions that can be formulated and maintained (e.g., stored) with minimal or fewer quantities of solvent and other additives, compared to prior art compositions.

There is a need, therefore, for improved emulsifiers for use in invert emulsions that can be used, for example, in oil well drilling.

SUMMARY

Methods for making emulsifiers, emulsified drilling fluids, and methods for using the same are provided. In one or more embodiments, the method for making an emulsifier can include mixing a tall oil and a triamide. The triamide can have the general chemical formula, Formula (I):

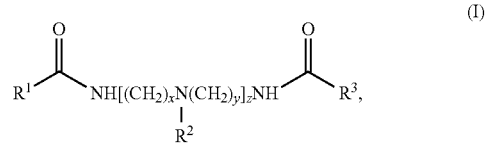

where:
x, y, and z are integers independently selected from 1 to 10,
$R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl,
$R^2$ is H or

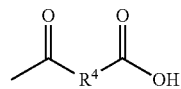

independently selected for each $[CH_2)_x NR^2 (CH_2)_y]$ unit, where $R^4$ is a $C_1$-$C_3$ alkylene or a $C_1$-$C_3$ alkylene alcohol, and where at least one $R^2$ is

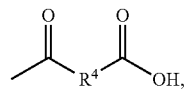

and
$R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

In some embodiments, the method for making an emulsifier can include mixing a triamide and a tall oil. The triamide can be prepared by reacting a diamidoamine with a saturated dicarboxylic acid, a saturated acid anhydride, or a mixture thereof. The method can also include spray drying the emulsifier to provide a spray dried emulsifier.

The method for making a drilling fluid can include mixing an oil phase, an aqueous phase, and a spray dried emulsifier to produce a drilling fluid. The spray dried emulsifier can include a mixture of a tall oil and a triamide, where the triamide can have Formula (I).

DETAILED DESCRIPTION

Methods for making emulsifiers, emulsified drilling fluids, and methods for using the same are provided. In one or more embodiments, the emulsifier can be made by mixing, blending, or otherwise combining one or more tall oils and one or more triamides. The one or more triamides can be represented by the general chemical formula, Formula (I):

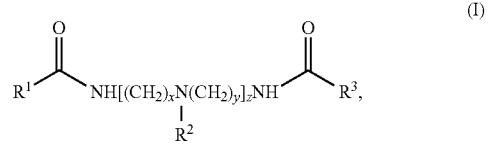

where:
x, y, and z are integers independently selected from 1 to 10, $R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl, $R^2$ is H or

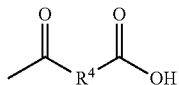

independently selected for each $[(CH_2)_xNR^2(CH_2)_y]$ unit, where $R^4$ is a $C_1$-$C_3$ alkylene or a $C_1$-$C_3$ alkylene alcohol, and where at least one $R^2$ is

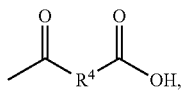

and $R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

The $C_1$-$C_3$ alkylene for $R^4$ can include, but is not limited to, a methylene or methanediyl group (—$CH_2$—), an ethylene or ethanediyl group (—$CH_2CH_2$—), and a propylene or propanediyl group (—$CH_2CH_2CH_2$—), which provides a saturated alkane moiety in the triamide. The $C_1$-$C_3$ alkylene alcohol for $R^4$ can include, but is not limited to, a methylene or methanediyl alcohol group (—C(OH)H—), an ethylene or ethanediyl alcohol group (—$CH_2$C(OH)H—), and a propylene or propanediyl alcohol group (—$CH_2$C(OH)H$CH_2$— or —$CH_2CH_2$C(OH)H—), which provides a saturated alkane alcohol moiety in the triamide.

In some embodiments, the emulsifier can be used for oil-based drilling fluids. It has been surprisingly and unexpectedly discovered that when $R^4$ is a $C_1$-$C_3$ alkylene or a $C_1$-$C_3$ alkylene alcohol, e.g., a saturated carbon chain, the oil-based drilling fluids can exhibit one or more of the following properties: flatter low end rheology, lower high end rheology, higher electrical stability, lower plastic viscosity, lower gel strengths, and lower fluid loss to the subterranean formation, as compared to the same emulsifier, but having an unsaturated $R^4$, e.g., an $R^4$ having at least one carbon-carbon double bond. For example, the emulsifier having $R^4$ as a $C_1$-$C_3$ alkylene or a $C_1$-$C_3$ alkylene alcohol can improve the low end rheology, the high end rheology, the electrical stability, the gel strengths, plastic viscosity, fluid break-through, and/or the fluid loss by about 0.2%, about 0.5%, about 1%, about 2%, about 3%, about 4%, about 5%, or about 10%, or more as compared to the same emulsifier but having an unsaturated $R^4$, such as when $R^4$ is alkenylene (e.g., —($C_nH_{2n-2}$)—, where n is 1, 2, or 3).

The one or more tall oils and the one or more triamides of the emulsifier can be combined with one another in any ratio. For example, the weight ratio of the triamide to the tall oil can be about 99:1, about 90:10, about 80:20, about 70:30, about 60:40, or about 50:50 to about 40:60, about 30:70, about 20:80, about 10:90, or about 1:99. In another example, the weight ratio of the triamide to tall oil can be about 0.5:1, about 1:1, about 2:3, about 3:7, or about 1:4. In another example, the weight ratio of the triamide to tall oil can be about 0.1:1 to about 3:1, about 0.2:1 to about 2.8:1, about 0.3:1 to about 2.5:1, about 0.4:1 to about 2.2:1, about 0.5:1 to about 2:1, about 0.3:1 to about 2:1, about 1:1 to about 3:1, about 0.4:1 to about 1:1, about 0.4:1 to about 0.7:1, or about 0.3:1 to about 1:1.

In some embodiments, the emulsifier can have an acid value of about 100 mg of KOH, about 125 mg of KOH, or about 150 mg of KOH to about 250 mg of KOH, about 175 mg of KOH, about 200 mg of KOH, per gram of emulsifier. For example, the emulsifier can have an acid value of about 100 mg of KOH to about 150 mg of KOH, about 125 mg of KOH to about 175 mg of KOH, about 170 mg of KOH to about 200 mg of KOH, about 170 mg of KOH to about 225 mg of KOH, about 165 mg of KOH to about 230 mg of KOH, about 180 mg of KOH to about 220 mg of KOH, about 200 mg of KOH to about 250 mg of KOH, about 225 mg of KOH to about 250 mg of KOH, or about 250 mg of KOH to about 300 mg of KOH, per gram of emulsifier. In another example, the emulsifier can have an acid value of at least 100 mg of KOH, at least 110 mg of KOH, at least 120 mg of KOH, at least 130 mg KOH, at least 150 mg KOH, or at least 175 mg KOH. In another example, the emulsifier can have an acid value of less than 220 mg KOH, less than 170 mg KOH, or less than 150 mg KOH.

As used herein, the term "acid value" refers to the mass of potassium hydroxide (KOH) in milligrams that is required to neutralize one gram of a reaction mixture or a composition. For example, the acid value of the emulsifier refers to the amount of KOH in milligrams required to neutralize one gram of the emulsifier. The acid value can be used as a measure of the amount of carboxylic acid groups in a reaction mixture or a composition. In a typical procedure, a known amount of the composition is dissolved in organic solvent and titrated with a solution of potassium hydroxide of known concentration. The acid value can be determined by using a potassium hydride solution that contains phenolphthalein as a color indicator or using potentiometric analysis. Standard methods used for determining acid value include ASTM D 465-05 and AOCS Te 1a-64.

The rheology, electrical stability, gel strengths, plastic viscosity, yield point, high temperature/high pressure, fluid break-through, and fluid loss can be tested according to the API Recommended Practice Standard 13B-2, Third Edition, February 1998. The drilling fluid can have a rheology of about 3, about 5, or about 7 to about 15, about 17, or about 20, after hot roll at 3 rotations per minute (rpm) at 150° F. For example, the drilling fluid can have a rheology of about 4 to about 7, about 5 to about 10, about 6 to about 17, about 8 to about 15, or about 8 to about 28, after hot roll at 3 rpm at 150° F. The drilling fluid can have a rheology of about 3, about 5, or about 7 to about 15, about 17, about 23, about 27, or about 30, after hot roll at 6 rpm at 150° F. For example, the drilling fluid can have a rheology of about 4 to about 7, about 5 to about 10, about 6 to about 17, about 8 to about 15, or about 6 to about 28, after hot roll at 6 rpm at 150° F. The drilling fluid can have a rheology of about 45, about 50, or about 55 to about 70, about 75, about 85, after hot roll at 600 rpm at 150° F. For example, the drilling fluid can have a rheology of about 40 to about 70, about 50 to about 67, about 50 to about 70, or about 55 to about 85, after hot roll at 600 rpm at 150° F.

The drilling fluid containing the emulsifier can have a ten second gel strength of about 3 lb/100 ft$^2$, about 5 lb/100 ft$^2$, or about 7 lb/100 ft$^2$ to about 15 lb/100 ft$^2$, about 17 lb/100 ft$^2$, about 30 lb/100 ft$^2$, after hot roll at 150° F. For example, the drilling fluid can have a ten second gel strength of about 4 lb/100 ft$^2$ to about 7 lb/100 ft$^2$, about 5 lb/100 ft$^2$ to about 10 lb/100 ft$^2$, about 6 lb/100 ft$^2$ to about 17 lb/100 ft$^2$, about 8 lb/100 ft$^2$ to about 15 lb/100 ft$^2$, or about 14 lb/100 ft$^2$ to about 28 lb/100 ft$^2$, after hot roll at 150° F.

The drilling fluid containing the emulsifier can have a ten minute gel strength of about 3 lb/100 ft$^2$, about 5 lb/100 ft$^2$, or about 7 lb/100 ft² to about 15 lb/100 ft², about 17 lb/100 ft², about 30 lb/100 ft², after hot roll at 150° F. For example, the drilling fluid can have a ten minute gel strength of about 4 lb/100 ft² to about 7 lb/100 ft², about 5 lb/100 ft² to about 10 lb/100 ft², about 6 lb/100 ft² to about 17 lb/100 ft², about 8 lb/100 ft² to about 15 lb/100 ft², or about 14 lb/100 ft² to about 28 lb/100 ft², after hot roll at 150° F.

The drilling fluid containing the emulsifier can have a plastic viscosity of about 15 cP, about 17 cP, or about 19 cP to about 25 cP, about 27 cP, about 30 cP, after hot roll at 150° F. For example, the drilling fluid can have a plastic viscosity of about 15 cP to about 17 cP, about 5 cP to about 10 cP, about 6 cP to about 17 cP, about 8 cP to about 15 cP, or about 14 cP to about 28 cP, after hot roll at 150° F.

The drilling fluid containing the emulsifier can have a yield point of about 3 lb/100 ft², about 5 lb/100 ft², or about 7 lb/100 ft² to about 15 lb/100 ft², about 17 lb/100 ft², about 30 lb/100 ft², after hot roll at 150° F. For example, the drilling fluid can have a yield point of about 4 lb/100 ft² to about 7 lb/100 ft², about 5 lb/100 ft² to about 10 lb/100 ft², about 6 lb/100 ft² to about 17 lb/100 ft², about 8 lb/100 ft² to about 15 lb/100 ft², or about 8 lb/100 ft² to about 28 lb/100 ft², after hot roll at 150° F.

The drilling fluid containing the emulsifier can have higher electrical stability. The drilling fluid containing the emulsifier can have an electrical stability of about 600 V, about 700 V, or about 725 V to about 800 V, about 1,000 V, or about 1,200 V, at 150° F. For example, the drilling fluid containing the emulsifier can have an electrical stability of about 600 V to about 650 V, about 650 V to about 700 V, about 675 V to about 750 V, about 700 V to about 760 V, about 725 V to about 850 V, about 825 V to about 950 V, about 925 V to about 1,100 V, or about 1,000 V to about 1,200 V, at 150° F.

The drilling fluid containing the emulsifier can have high temperature/high pressure fluid loss of about 5 mL, about 6 mL, or about 7 mL to about 10 mL, about 12 mL, about 14 mL, after hot roll at 150° F. For example, the drilling fluid can have a fluid loss of about 4 mL to about 7 mL, about 5 mL to about 10 mL, about 6 mL to about 11 mL, or about 8 mL to about 14 mL, after hot roll at 150° F.

The drilling fluid containing the emulsifier can exhibit minimal water break-through under high temperature/high pressure testing conditions. The drilling fluid containing the emulsifier can have a water break-through value of about 0 mL, about 0.1 mL, or about 0.2 mL to about 0.5 mL, at high temperature/high pressure testing conditions. For example, the drilling fluid containing the emulsifier can have a water break-through value of about 0 mL to about 0.1 mL, about 0.1 mL to about 0.2 mL, about 0.2 mL to about 0.3 mL, about 0.3 mL to about 0.4 mL, or about 0.4 mL to about 0.5 mL, at high temperature/high pressure testing conditions.

The compounds of Formula (I) can be made using one or more different synthetic routes. One exemplary synthetic route can include sequential condensation reactions as shown in Scheme (I) below. More particularly, a polyamine can be reacted with fatty acids to produce an amidoamine product. The amidoamine product can be reacted with a succinic anhydride to produce a triamide. In the specific embodiment depicted in Scheme (I), two molecules of the same kind of fatty acid are reacted with diethylenetriamine as the polyamine to form a diamidoamine or "intermediate product." In a subsequent condensation reaction, the diamidoamine is reacted with succinic anhydride as the saturated dicarboxylic acid to produce a triamide. Exemplary Scheme (I) is as follows:

Scheme (I)

(Reaction 1)

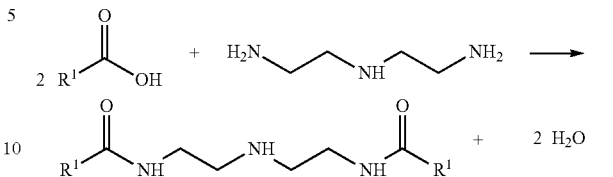

(Reaction 2)

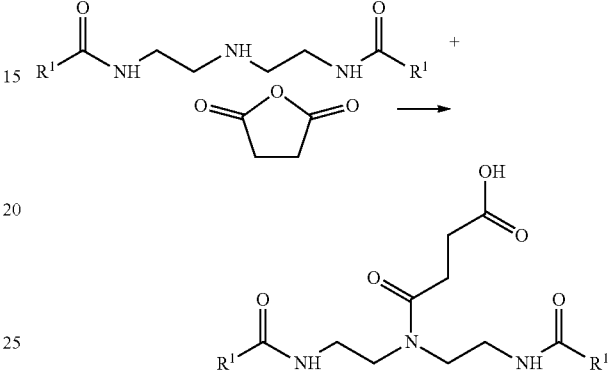

It can be seen that the triamide depicted in Scheme (I) has the molecular structure of Formula (I), where $R^1$ and $R^4$ are the same.

The reaction conditions, e.g., heating, can be controlled to favor the more thermodynamically stable amide product. Any of the amine functional groups on the polyamine can undergo a condensation reaction with the carboxylic acid group of the fatty acid; however, the primary amines can be more kinetically favored than the secondary amines on the polyamine. By controlling the reaction conditions, such as the concentration of the reactants, the reaction of one fatty acid molecule for every primary amine on the polyamine can be favored. A thermodynamically and kinetically favored diamidoamine has been depicted in Reaction 1 of Scheme (I).

The diamidoamine can then be reacted with a saturated dicarboxylic acid and/or a saturated acid anhydride. Reaction 2 of Scheme (I) depicts a condensation reaction between the diamidoamine and succinic anhydride. At least one of the acyl moieties on the succinic anhydride can react with at least one of the secondary amine functional groups on the diamidoamine (for diethylenetriamine only one secondary amine is present) to form a third amide group. The second acyl moiety on the anhydride can react with a second diamidoamine in the reaction mixture, e.g., two diamidoamine molecules can react with one anhydride compound. By controlling the reaction conditions, however, such as the concentrations of the reactants, the reaction between one diamidoamine molecule and one dicarboxylic acid or acid anhydride molecule can be favored. Also, if the reaction is performed with an acid anhydride compound instead of a dicarboxylic acid compound, a lower temperature can be used, which leads to less cross-linking between diamidoamines. In one or more examples, the reaction product can be triamide, as illustrated in Reaction 2 of Scheme (I).

In one or more examples, after a single condensation reaction of the fatty acid and the polyamine, a self-cyclization reaction can produce an imidazoline (e.g., a 1-aminoalkyl-2-alkyl-2-imidazoline). For clarity, Reaction 3 has been included to show an exemplary imidazoline product when the reactant polyamine is diethylenetriamine.

(Reaction 3)

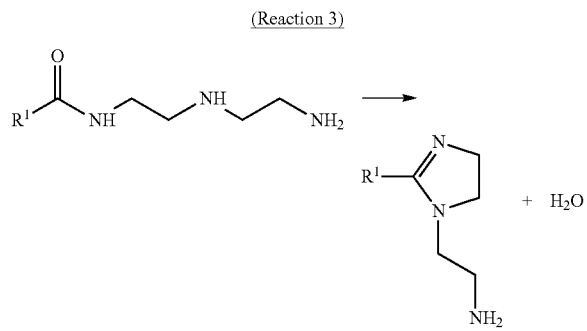

The reaction mixture for the diamidoamine and, if the subsequent reaction is performed in a single pot, the reaction mixture for the triamide can also include the imidazoline product. The primary amine of the imidazoline product can also react with the saturated dicarboxylic acid and/or saturated acid anhydride. Because the imidazoline product is less effective as an emulsifier, the reaction conditions, such as reaction temperature, can be chosen to limit the imidazoline reaction product. Exemplary reaction conditions for limiting the imidazoline reaction product can include those discussed and described in U.S. Pat. No. 3,758,493.

One or more fatty acids, one or more polyamines, and one or more liquid media can be mixed to from a diamidoamine reaction mixture. The molar ratio of the carboxylic acid group on the fatty acid to the primary amine groups on the polyamine can be used to favor a reaction between one fatty acid molecule for every primary amine group on the polyamine. For example, e molar ratio of the carboxylic acid group to the primary amine group can be about 0.5:1 to about 1.1:1. In another example, the molar ratio of the carboxylic acid group to the primary amine group can be about 0.5:1 to about 0.7:1, about 0.6:1 to about 0.8:1, about 0.7:1 to about 1:1, about 0.9:1 to about 1:1, or about 0.8:1 to about 1.1:1.

The diamidoamine reaction mixture can be heated to a temperature of about 130° C., about 140° C., about 145° C. to about 170° C., about 180° C., or about 200° C. For example, the reaction temperature can be about 140° C. to about 150° C., about 145° C. to about 155° C., about 155° C. to about 165° C., about 160° C. to about 170° C., about 155° C. to about 170° C., about 160° C. to about 190° C., or about 180° C. to about 200° C. The diamidoamine reaction mixture of the fatty acids and the polyamine can be heated for, or otherwise have a reaction time of, about 0.5 hours, about 1 hour, about 2 hours, about 3 hours, about 4 hours, about 5 hours, about 6 hours, about 7 hours, about 8 hours, about 9 hours, about 10 hours, about 11 hours, about 12 hours, or greater. For example, the fatty acids and the polyamine can be heated or reacted for about 0.7 hours to about 1.3 hours, about 0.7 hours to about 1.3 hours, about 1 hour to about 3 hours, about 1.5 hours to about 4 hours, about 2 hours to about 5 hours, about 3 hours to about 7 hours, about 5 hours to about 8 hours, about 6 hours to about 10 hours, about 8 hours to about 12 hours.

The fatty acids and the polyamine can be reacted until a desired acid value is obtained. The diamidoamine reaction mixture can have an acid value of about 3 mg of KOH, about 5 mg of KOH, or about 7 mg of KOH to about 15 mg of KOH, about 20 mg of KOH, or about 25 mg of KOH, per gram of diamidoamine reaction mixture. For example, the diamidoamine reaction mixture can have an acid value of about 3 mg of KOH to about 5 mg of KOH, about 4 mg of KOH to about 8 mg of KOH, about 7 mg of KOH to about 12 mg of KOH, about 9 mg of KOH to about 15 mg of KOH, about 10 mg of KOH to about 16 mg of KOH, about 14 mg of KOH to about 20 mg of KOH, about 16 mg of KOH to about 25 mg of KOH, per gram of diamidoamine reaction mixture.

The diamidoamine reaction mixture can include a solvent or diluent, also referred to as "liquid medium." The diamidoamine reaction can also be performed neat so the diamidoamine reaction mixture can be free of solvent or liquid medium. The diamidoamine reaction mixture can have a liquid medium concentration of about 0.1 wt %, about 1 wt %, or about 3 wt % to about 10 wt %, about 15 wt %, or about 20 wt %, based on the combined weight of the fatty acids, the polyamines, and the liquid medium. In another example, the diamidoamine reaction mixture can have a liquid medium concentration of about 0.1 wt % to about 3 wt %, about 0.1 wt % to about 4 wt %, about 1 wt % to about 6 wt %, about 3 wt % to about 8 wt %, about 7 wt % to about 14 wt %, about 11 wt % to about 17 wt %, or about 12 wt % to about 20 wt %, the polyamines, and the liquid medium. During the reaction, the liquid medium can be distilled or evaporated from the diamidoamine reaction mixture, which can change the concentration of the liquid medium.

The diamidoamine reaction mixture can have a solids content of about 80 wt %, about 85 wt %, or about 90 wt % to about 95 wt %, about 98 wt %, or about 100 wt % (e.g., where the solvent-free system has 100 wt % solids), based on the total weight of the reaction mixture. In another example, the diamidoamine reaction mixture can have a solids content of about 80 wt % to about 85 wt %, about 85 wt % to about 90 wt %, about 90 wt % to about 95 wt %, about 94 wt % to about 98 wt %, about 96 wt % to about 99 wt %, or about 96 wt % to about 100 wt %, based on the total weight of the reaction mixture. As used herein, the solids content, as understood by those skilled in the art, can be measured by determining the weight loss upon heating a small sample (e.g., about 1 gram to about 5 grams) of the reaction mixture, to a suitable temperature, e.g., about 125° C., and a time sufficient to remove the liquid therefrom.

Illustrative fatty acids that can be reacted with the polyamine to form the diamidoamine can include, but are not limited to, the alkanoic and alkenoic fatty acids having from about 6 carbon atoms to about 24 carbon atoms, such as lauric acid, myristic acid, palmitic acid, stearic acid, arachidic acid, behenic acid, oleic acid, linoleic acid, erucic acid, or any combination thereof Mixtures of fatty acids can also be used. Illustrative fatty acids can be provided or used in the form of crude tall oil (CTO), one or more tall oil distillation products, one or more vegetable oils, and any mixture thereof.

In one embodiment, crude tall oil can be made or produced as an acidified byproduct in the kraft or sulfate processing of wood. Crude tall oil, prior to refining, can include a mixture of rosin acids, fatty acids, sterols, high-molecular weight alcohols, and other alkyl chain materials. The components of crude tall oil depend on a variety of factors, such as the particular coniferous species of the wood being processed (wood type), the geographical location of the wood source, the age of the wood, the particular season that the wood is harvested, and others. Thus, depending on the particular source, crude tall oil can contain about 20 wt % to about 75 wt % of fatty acids (e.g., about 30 wt % to about 60 wt % of fatty acids), about 20 wt % to about 65 wt % of rosin acids and the balance being the neutral and non-saponifiable components. Crude tall oil can contain at least 10 wt % of neutral materials or non-saponifiable components.

Distillation of crude tall oil can be used to recover a mixture of fatty acids in the $C_{16}$-$C_{20}$ range. Fatty acids found in tall oils can include, but are not limited to, oleic acid, linoleic acid, stearic acid, and palmitic acid. Rosin acids found in tall oils, include, but are not limited to, abietic acid, dehydroabietic acid, isopimaric acid, and pimaric acid. Examples of tall oil distillation products that can be used as the fatty acids or at to make up at least a portion of the fatty acids discussed and described herein can include, but are not limited to, tall oil fatty acids (TOFA), distilled tall oil (DTO), tall oil pitch, or any mixture thereof.

The distilled tall oil fraction can have a fatty acids and esters of fatty acids concentration of about 55 wt %, about 60 wt %, or about 65 wt % to about 85 wt %, about 90 wt %, or about 95 wt %. The distilled tall oil fraction can have a rosin acids or rosins concentration of about 5 wt %, about 10 wt %, or about 15 wt % to about 30 wt %, about 35 wt %, or about 40 wt %. The distilled tall oil fraction can have a neutrals concentration of about 0.1 wt %, about 1 wt %, or about 1.5 wt % to about 2 wt %, about 3.5 wt %, or about 5 wt %. The distilled tall oil fraction can have an acid value of about 20, about 25, or about 30 to about 40, about 45, or about 50. The distilled tall oil fraction can have a viscosity (centipoise at 85° C.) of about 10 cP, about 20 cP, about 30 cP, or about 40 cP to about 100 cP, about 120 cP, about 135 cP, or about 150 cP. The distilled tall oil can have a density of about 840 g/L, about 860 g/L, or about 880 g/L to about 900 g/L, about 920 g/L, or about 935 g/L. The distilled tall oil fraction can have a saponification number of about 180, about 185, or about 190 to about 200, about 205, or about 210. The distilled tall oil fraction can have an iodine value of about 115, about 117, or about 120 to about 130, about 135, or about 140.

The rosin acids derived from crude tall oil are also an intermediate fraction that can be produced from the distillation of crude tall oil. The tall oil rosin can have a concentration of rosin acids of about 80 wt %, about 85 wt %, or about 90 wt % to about 93 wt %, about 95 wt %, or about 99 wt %. The tall oil rosin can have a concentration of abietic acid of about 35 wt %, about 40 wt %, or about 43 wt % to about 50 wt %, about 55 wt %, or about 60 wt %. The tall oil rosin can have a concentration of dehydroabietic acid of about 10 wt %, about 13 wt %, or about 15 wt % to about 20 wt %, about 23 wt %, or about 25 wt %. The tall oil rosin can have a concentration of isopimaric acid of about 10 wt % or less, about 8 wt % or less, about 5 wt % or less, or about 3 wt % or less. The tall oil rosin can have a concentration of pimaric acid of about 10 wt % or less, about 8 wt % or less, about 5 wt % or less, or about 3 wt % or less. The tall oil rosin can have a fatty acids concentration of about 0.5 wt %, about 1 wt %, or about 2 wt % to about 3 wt %, about 5 wt %, or about 10 wt %. The tall oil rosin can have a concentration of neutral materials of about 0.5 wt %, about 1 wt %, or about 2 wt % to about 3 wt %, about 5 wt %, or about 10 wt %. The tall oil rosin can have a density of about 960 g/L, about 970 g/L, or about 980 g/L to about 1,000 g/L, about 1,010 g/L, or about 1,020 g/L. The tall oil rosin can have an acid value of about 150, about 160, or about 165 to about 170, about 175, or about 180.

Representative tall oil products can include saturated and unsaturated fatty acids in the $C_{16}$-$C_{18}$ range, as well as minor amounts of rosin acids, and can include XTOL® 100, XTOL® 300, and XTOL® 304, XTOL® 520, and LYTOR® 100, all of which are commercially available from Georgia-Pacific Chemicals LLC, Atlanta, Ga. XTOL® 100 includes about 1.6 wt % of palmitic acid, about 2.5 wt % of stearic acid, about 37.9 wt % of oleic acid, about 26.3 wt % of linoleic acid, about 0.3 wt % of linolenic acid, about 2.9 wt % of linoleic isomers, about 0.2 wt % of arachidic acid, about 3.6 wt % eicosatrienoic acid, about 1.4 wt % of pimaric acid, <0.16 wt % of sandarocopimaric, <0.16 wt % of isopimaric acid, <0.16 wt % of dehydroabietic acid, about 0.2 wt % of abietic acid, with the balance being neutrals and high molecular weight species. LYTOR® 100 includes <0.16 wt % of palmitic acid, <0.16 wt % of stearic acid, about 0.2 wt % of oleic acid, about 0.2 wt % of arachidic acid, about 0.2 wt % eicosatrienoic acid, about 2.2 wt % of pimaric acid, about 0.6 wt % of sandarocopimaric, about 8.5 wt % of palustric acid, about 1.6 wt % of levopimaric acid, about 2.8 wt % of isopimaric acid, about 15.3 wt % of dehydroabietic acid, about 51.4 wt % of abietic acid, about 2.4 wt % of neoabietic acid, with the balance being neutrals and high molecular weight species. XTOL® 520 DTO includes about 0.2 wt % of palmitic acid, about 3.3 wt % of stearic acid, about 37.9 wt % of oleic acid, about 26.3 wt % of linoleic acid, about 0.3 wt % of linolenic acid, about 2.9 wt % of linoleic isomers, about 0.2 wt % of arachidic acid, about 3.6 wt % eicosatrienoic acid, about 1.4 wt % of pimaric acid, <0.16 wt % wt % of sandarocopimaric, <0.16 wt % of isopimaric acid, <0.16 wt % of dehydroabietic acid, about 0.2 wt % of abietic acid, with the balance being neutrals and high molecular weight species. Such tall oil products can be used in the reaction with the polyamine or a mixture of polyamines. Other fatty acids and mixtures of fatty acids, including oxidized and/or dimerized tall oil, such those discussed below can also be employed.

Illustrative vegetable oils that can be used as the fatty acids can include, but are not limited to, safflower oil, grapeseed oil, sunflower oil, walnut oil, soybean oil, cottonseed oil, coconut oil, corn oil, olive oil, palm oil, palm olein, peanut oil, rapeseed oil, canola oil, sesame oil, hazelnut oil, almond oil, beech nut oil, cashew oil, macadamia oil, mongongo nut oil, pecan oil, pine nut oil, pistachio oil, grapefruit seed oil, lemon oil, orange oil, watermelon seed oil, bitter gourd oil, buffalo gourd oil, butternut squash seed oil, egusi seed oil, pumpkin seed oil, borage seed oil, blackcurrant seed oil, evening primrose oil, açaaí oil, black seed oil, flaxseed oil, carob pod oil, amaranth oil, apricot oil, apple seed oil, argan oil, avocado oil, babassu oil, ben oil, borneo tallow nut oil, cape chestnut, algaroba oil, cocoa butter, cocklebur oil, poppyseed oil, cohune oil, coriander seed oil, date seed oil, dika oil, false flax oil, hemp oil, kapok seed oil, kenaf seed oil, lallemantia oil, mafura oil, manila oil, meadowfoam seed oil, mustard oil, okra seed oil, papaya seed oil, perilla seed oil, persimmon seed oil, pequi oil, pili nut oil, pomegranate seed oil, prune kernel oil, quinoa oil, ramtil oil, rice bran oil, royle oil, shea nut oil, sacha inchi oil, sapote oil, seje oil, taramira oil, tea seed oil, thistle oil, tigernut oil, tobacco seed oil, tomato seed oil, wheat germ oil, castor oil, colza oil, flax oil, radish oil, salicornia oil, tung oil, honge oil, jatropha oil, jojoba oil, nahor oil, paradise oil, petroleum nut oil, dammar oil, linseed oil, stillingia oil, vernonia oil, amur cork tree fruit oil, artichoke oil, balanos oil, bladderpod oil, brucea javanica oil, burdock oil, candlenut oil, carrot seed oil, chaulmoogra oil, crambe oil, croton oil, cuphea oil, honesty oil, mango oil, neem oil, oojon oil, rose hip seed oil, rubber seed oil, sea buckthorn oil, sea rocket seed oil, snowball seed oil, tall oil, tamanu oil, tonka bean oil, ucuhuba seed oil, or any mixture thereof.

If the fatty acid includes two or more fatty acids, each fatty acid can be present in the same concentration or different concentrations with respect to one another. For example, a first fatty acid can be present in a weight ratio of about 99:1, about 90:10, about 80:20, about 70:30, about 60:40, about 50:50, about 40:60, about 30:70, about 20:80, about 10:90, or about 1:99 with respect to another or "second" fatty acid contained therein. Similarly, if three or more fatty acids are mixed, the three or more fatty acids can be present in any ratio.

The polyamine reacted with the one or more fatty acids to produce the diamidoamine can include, but is not limited to, one or more compounds having the general chemical formal, Formula (II):

$$H_2N[(CH_2)_xNH]_yH \qquad (II)$$

where x and y can be integers independently selected from 1 to 10. Representative polyamines include the polyethylene polyamines, when x is 2. Of this class of polyalkylene polyamines, specific examples can include, dimethylenetriamine (x=1, y=2), diethylenetriamine (x=2, y=2), triethylenetetramine (x=2, y=3), tripropylenetetramine (x=3, y=3) tetraethylenepentamine (x=2, y=4), and pentaethylenehexamine (x=2, y=5).

The polyamine can be or include a mixture of two or more polyamines. If the polyamines include two or more polyamines, each polyamine can be present in the same concentration or different concentrations with respect to one another. For example, a first polyamines can be present in a weight ratio of about 99:1, about 90:10, about 80:20, about 70:30, about 60:40, about 50:50, about 40:60, about 30:70, about 20:80, about 10:90, or about 1:99 with respect to another or "second" polyamine contained therein. Similarly, if three or more polyamines are mixed, the three or more polyamines can be present in any ratio.

The liquid medium, if present, can be or include water. The water can be added or generated during the condensation reactions or both. The liquid medium can also be or include one or more polar aprotic solvents, one or more polar protic solvents, or any combination thereof. Illustrative polar aprotic solvents can include, but are not limited to, tetrahydrofuran ("THF"), dimethyl sulfoxide ("DMSO"), N-methylpyrrolidone ("NMP"), dimethyl acetamide, acetone, or any combination thereof. Illustrative polar protic solvents can include, but are not limited to, methanol, ethanol, propanol, butanol, or any combination thereof.

One or more diamidoamines, one or more liquid media, and the saturated dicarboxylic acid and/or the saturated acid anhydride can be mixed to form a triamide reaction mixture. The diamidoamine, the liquid media, and the saturated dicarboxylic acid and/or saturated acid anhydride can be combined with one another in any order or sequence. The diamidoamine can be isolated from the diamidoamine reaction mixture and then mixed with the liquid medium and the saturated dicarboxylic acid and/or the saturated acid anhydride to make the triamide reaction mixture. Or, the liquid medium and the saturated dicarboxylic acid and/or the saturated acid anhydride can be mixed with the diamidoamine reaction mixture to make the triamide reaction for a one pot synthesis.

The molar ratio of the carboxylic acid groups on the saturated dicarboxylic acid to the secondary amine groups on the diamidoamine can be used to favor the reaction product between one saturated dicarboxylic acid molecule and one diamidoamine molecule. For example, the molar ratio of carboxylic acid groups to secondary amine groups can be about 0.4:1, about 0.5:1, or about 0.7:1 to about 0.9:1, about, 1.0:1, or about 1.2:1. In another example, the molar ratio of the carboxylic acid groups to secondary amine groups can be about 0.4:1 to about 0.6:1, about 0.5:1 to about 0.7:1, about 0.7:1 to about 0.9:1, about 0.8:1 to about 1.1:1, about 0.9:1 to about 1:1, about 0.9:1 to about 1.1:1, or about 0.9:1 to about 1.2:1.

The molar ratio of the anhydride group on the saturated acid anhydride to the secondary amine groups on the diamidoamine can be used to favor the reaction product between one saturated acid anhydride molecule and one diamidoamine molecule. For example, the molar ratio of the anhydride group to the secondary amine groups can be about 0.2:1, about 0.4:1, or about 0.6:1 to about 0.8:1, about 0.9:1, or about 1:1. In another example, the molar ratio of the anhydride group to the secondary amine groups can be about 0.2:1 to about 1:1, about 0.4:1 to about 0.9:1, about 0.75:1 to about 0.85:1, or about 0.78:1 to about 0.82:1.

The reaction between the diamidoamine and the saturated dicarboxylic acid or the saturated anhydride can be at a temperature of about 25° C., about 40° C., or about 60° C. to about 130° C. about 150° C. or about 175° C. For example, the reaction temperature can be about 30° C. to about 60° C., about 55° C. to about 85° C., about 60° C. to about 80° C., about 70° C. to about 90° C., about 70° C. to about 80° C., about 73° C. to about 95° C., about 92° C. to about 130° C., about 120° C. to about 160° C., and about 160° C. to about 200° C. Relative to the use of the saturated acid anhydride, the use of the saturated dicarboxylic acid to react the terminal amine groups of the fatty acid amine condensate to terminal carboxylic acid groups often requires higher reaction temperatures.

The reaction time for the reaction between the diamidoamine and the saturated dicarboxylic acid or the saturated anhydride can be about 0.2 hours, about 0.4, or about 0.5 to about 1 hour, about 1.5 hours or about 2 hours. For example, the reaction time can be about 0.2 hours to about 0.6 hours, about 0.5 hours to about 1 hour, about 0.6 hours to about 0.8 hours, about 0.7 hours to about 1 hour, about 1 hour to about 1.5 hours, about 1 hour to about 1.2 hours, or about 1 hour to about 2 hours. Relative to the use of a saturated acid anhydride, the use of a saturated dicarboxylic acid to convert the secondary amine groups to the amide groups often requires longer reaction times.

The diamidoamine and the saturated dicarboxylic acid or the saturated anhydride can be reacted until a desired acid value is obtained. The acid value of the triamide reaction mixture can be about 20 mg of KOH, about 30 mg of KOH, or about 40 mg of KOH to about 80 mg of KOH, about 90 mg of KOH, or about 100 mg of KOH, per gram of triamide reaction mixture. For example, the triamide reaction mixture can have an acid value of about 25 mg of KOH to about 35 mg of KOH, about 30 mg of KOH to about 50 mg of KOH, about 50 mg of KOH to about 70 mg of KOH, about 55 mg of KOH to about 65 mg of KOH, about 60 mg of KOH to about 90 mg of KOH, about 80 mg of KOH to about 100 mg of KOH, per gram of triamide reaction mixture. The acid value can be used as a measure of the amount of carboxylic acid groups in the triamide reaction mixture.

The triamide reaction mixture can include a solvent or diluent or "liquid medium." Suitable liquid mediums can be or include those liquid mediums discussed and described above with reference to the diamidoamine reaction mixture. The triamide reaction can also be performed neat so the triamide reaction mixture can be free of solvent or liquid medium. The triamide reaction mixture can have a liquid medium concentration of about 0 wt %, about 1 wt %, or about 3 wt % to about 10 wt %, about 15 wt %, or about 20 wt %, based on the combined weight of the diamidoamine, the liquid medium, and the saturated dicarboxylic acid and/or the saturated acid anhydride. In another example, the diamidoamine reaction mixture can have a liquid medium concentration of about 0 wt % to about 3 wt %, about 0.1 wt % to about 4 wt %, about 1 wt % to about 6 wt %, about 3 wt % to about 8 wt %, about 7 wt % to about 14 wt %, about 11 wt % to about 17 wt %, or about 12 wt % to about 20 wt %, based on the combined weight of the diamidoamine, the liquid medium, and the saturated dicarboxylic acid and/or the saturated acid anhydride. During the reaction, the liquid medium can be distilled, evaporated, or otherwise separated from the triamide reaction mixture, which can change the concentration of the liquid medium.

The triamide reaction mixture can have a viscosity of about 55 cP, about 100 cP, or about 150 cP to about 2,000 cP, about 3,000 cP, or about 5,000 cP, at 90° C. For example, the viscosity of the triamide reaction mixture can have a viscosity of about 65 cP to about 105 cP, about 100 cP to about 500 cP, about 400 cP to about 1,000 cP, about 900 cP to about 1,200 cP, about 1,000 cP to about 1,500 cP, about 1,300 cP to about 1,600 cP, about 1,500 cP to about 2,000 cP, about 1,800 cP to about 2,600 cP, about 2,000 cP to about 3,000, about 2,500 cP to about 4,000, about 3,000 cP to about 5,000, at 90° C. The viscosity can be used to characterize the reaction product. The viscosity can be determined using a Brookfield viscometer. The viscometer measures the torque required to rotate a spindle at constant speed in a solution of a diamidoamine reaction mixture at 25° C. Standard test methods used for measuring Brookfield viscosity are ASTM D 803-03 and AOCS Ja 10-87 (93).

The triamide reaction mixture can have a solids content of about 80 wt %, about 85 wt %, or about 90 wt % to about 95 wt %, about 98 wt %, or about 100 wt % (e.g., where the solvent-free system has 100 wt % solids), based on the total weight of the triamide reaction mixture. In another example, the diamidoamine reaction mixture can have a solids content of about 80 wt % to about 85 wt %, about 85 wt % to about 90 wt %, about 90 wt % to about 95 wt %, about 94 wt % to about 98 wt %, about 96 wt % to about 99 wt %, or about 96 wt % to about 100 wt %, based on the total weight of the triamide reaction mixture. During the reaction, water from the condensation between the diamidoamine and the saturated dicarboxylic acid or the saturated acid anhydride can be distilled from the triamide reaction mixture, which can change the solids content.

Representative saturated dicarboxylic acids can include, but are not limited to, succinic acid, adipic acid, malic acid, and glutaric acid and the like. Representative saturated acid anhydrides can include, but are not limited to, succinic anhydride, adipic anhydride, and glutaric anhydride.

The triamide can be at least partially isolated from triamide reaction mixture or the triamide reaction mixture can be mixed with the tall oil without further processing. The triamide and the tall oil can be combined with one another in any order or sequence.

Illustrative tall oils can include, but are not limited to, crude tall oil, distilled tall oil, tall oil bottoms, a dimerized tall oil, a Diels-Alder reaction product and/or an ene reaction product of tall oil with an one or more $\alpha,\beta$ unsaturated carboxylic acids or acid anhydrides, a Diels-Alder reaction product and/or an ene reaction product of tall oil with an one or more $\alpha,\beta$ unsaturated carboxylic acids or acid anhydrides that has also been dimerized, or any mixture thereof.

Representative tall oil distillate components include tall oil fatty acids, tall oil rosin acids, and mixtures of these fractions. As mentioned above, the refinement (e.g., fractionation) of tall oil can, for example, provide $C_{16}$-$C_{18}$ saturated and unsaturated fatty acids as well as fatty acid/rosin acid mixtures. Mixtures of tall oil distillate fractions can also be employed as the tall oil distillate component. Fatty acid and rosin acid mixtures in any desired ratio can be obtained in a single distillate fraction by adjusting tall oil fractionation conditions. Representative tall oil distillate components include XTOL® 100, XTOL® 300, and XTOL® 304, XTOL® 520, and LYTOR® 100, all commercially available from Georgia-Pacific Chemicals LLC, Atlanta, Ga.

In one specific embodiment, a mixture of a first tall oil distillate fraction comprising predominantly fatty acids (e.g., XTOL® 100) and a second tall oil distillate fraction comprising predominantly rosin acids (e.g., LYTOR® 100) can be mixed in any proportion. In such a mixture, representative amounts of fatty acids and rosin acids can be about 45 wt % to about 90 wt % and about 10 wt % to about 55 wt %, respectively. The mixing ratios of the first tall oil distillate fraction to second tall oil distillate fraction can be in a weight ratio of about 9:1, about 4:1, about 7:3, about 3:2, about 1:1, about 2:3, about 3:7, about 1:4, or about 1:9. Depending on the crude tall oil composition and fractionation conditions, a single tall oil distillate fraction can also suffice to yield a composition that is substantially the same as any of the mixes of tall oil distillate fractions discussed above.

The $\alpha,\beta$ unsaturated carboxylic acids or acid anhydrides can react with tall oil via the ene reaction or a Diels-Alder reaction on the tall oil fatty acids and/or the rosin acids in the tall oil. The modified tall oil product generated from the reaction of tall oil with the specific $\alpha,\beta$ unsaturated anhydride, maleic anhydride, can be referred to as a "maleated tall oil," which includes "maleated fatty acids" and "maleated rosin acids." Non-limiting examples of representative reactions that can occur can include those discussed and described in U.S. Pat. Nos.: 4,927,669; 8,133,970; and 8,334,363. The ene reaction and the Diels-Alder reaction are explained in further detail in Jerry March & Michael B. Smith, MARCH'S ADVANCED ORGANIC CHEMISTRY: REACTIONS, MECHANISMS, AND STRUCTURE (7th ed. John Wiley & Sons Inc. 2013) (1985).

The amount of $\alpha,\beta$ unsaturated carboxylic acid or acid anhydride reacted with the tall oil can vary based, at least in part, on the specific tall oil product to be reacted. Suitable amounts of the carboxylic acid and/or acid anhydride reacted with the tall oil can be about 1 wt %, about 2 wt %, about 3 wt %, about 5 wt %, about 10 wt %, or about 15 wt % to about 30 wt %, about 35 wt %, about 40 wt %, about 45 wt %, or about 50 wt %, based on the combined weight of the tall oil and the carboxylic acid and/or acid anhydride the desired amount of the Diels-Alder product and/or the ene product.

The tall oil can have the tall oil substituted with the $\alpha,\beta$ unsaturated carboxylic acids or acid anhydrides in an amount of about 1 wt %, about 3 wt %, or about 5 wt % to about 20 wt %, about 25 wt %, or about 30 wt %, based on the total weight of tall oil. For example, the tall oil can have the tall oil substituted with the $\alpha,\beta$ unsaturated carboxylic acids or acid anhydrides in an amount of about 2 wt % to about 7 wt %, about 5 wt % to about 10 wt %, about 10 wt % to about 20 wt %, about 18 wt % to about 22 wt %, about 20 wt % to about 27 wt %, based on the total weight of tall oil.

The reaction of tall oil and the $\alpha,\beta$ unsaturated carboxylic acids or acid anhydrides, can be performed at a reaction temperature of about 150° C. to about 250° C., about 200°

C. to about 230° C., or about 215° C. to about 225° C. The reaction can be quenched after a reaction time of about 12 hours, about 16 hours, about 20 hours, about 22 hours, about 26 hours, about 30 hours, about 34 hours, about 38 hours, or greater. For example, the reaction time can be about 12 hours to about 36 hours or about 20 hours to about 30 hours.

The dimerized tall oil can be obtained by catalytic dimerization of the tall oil fatty acids or by the oxidation of tall oil to provide an ether bond linking the fatty acid's hydrocarbon chain. In an embodiment, the catalytic dimerization can be clay catalyzed Diels-Alder type reaction that links at least two hydrocarbon chains of the tall oil fatty acids through a carbon-carbon bond. In another embodiment, tall oil can be oxidized by heating the tall oil material to a temperature of at least 150° C. For example, the tall oil can be heated to a temperature of about 155° C., about 160° C., or about 165° C. to about 170° C., about 180° C., about 190° C., about 200° C., or about 225° C., in the presence of an oxidant. In at least one specific example, the tall oil can be heated to a temperature of about 160° C. to about 170° C., followed by contacting the heated tall oil composition with oxygen or air. For example, the tall oil can be heated to a temperature of about 160° C. to about 170° C., followed by sparging oxygen or air through the heated tall oil composition. As understood by those skilled in the art, a variety of techniques and devices can advantageously be used to contact the heated tall oil with the oxygen or air and the present method is not limited to any specific technique or equipment.

The hydrocarbon chains can be fatty acids and rosin acids. The hydrocarbon chains can be, for example, $C_6$-$C_{22}$ fatty acids. The hydrocarbon chains can be, for example, $C_{16}$-$C_{22}$ fatty acids. The hydrocarbon chains can be, for example, $C_{16}$-$C_{18}$ fatty acids. The hydrocarbon chains can be, for example, a $C_{18}$ fatty acid. The hydrocarbon chains can be, for example, oleic acid, linoleic acid, and linolenic acid.

Illustrative Diels-Alder reaction product and/or an ene reaction product of tall oil with an one or more α,β unsaturated carboxylic acids or acid anhydrides and illustrative Diels-Alder reaction product and/or an ene reaction product of tall oil with one or more α,β unsaturated carboxylic acids or acid anhydrides that has also been dimerized can include those compositions discussed and described in U.S. Patent Application Publication Nos. 2008/0179570, 2008/0194795, 2009/0065736, and 2009/0194731.

The emulsifier can be neutralized (e.g., converted to its corresponding alkali or alkaline earth metal salt) before spray drying. The emulsifier used to form the spray dried emulsifier, namely the triamide and the tall oil, is acidic prior to neutralization. In the case of the triamide, acidity results from the installation of a carboxylic acid group from the condensation reaction of the diamidoamine to the saturated dicarboxylic acid and/or acid anhydride. In the case of the tall oil, acidity also results from the addition of the unsaturated dicarboxylic acid and/or unsaturated acid anhydride functionality (e.g., in the Diels-Alder reaction or the ene reaction with tall oil fatty acids and/or tall oil rosin acids). These acidic components can be neutralized (or saponified) by the addition of a suitable base.

Neutralization with an alkali metal hydroxide, an alkaline earth metal hydroxide, an alkali metal oxide, an alkaline earth metal oxide, or any mixture of these bases can result in the conversion of the triamide and the tall oil to their corresponding alkali metal salts and/or alkaline earth metal salts (e.g., carboxylate salts). For example, the carboxylic acid of the triamide can be reacted with any of these bases to form metal carboxylate groups (e.g., sodium carboxylate groups). Suitable bases within the classes given above include the hydroxides and oxides of lithium, sodium, potassium, and calcium. Compared to the oxides, the hydroxides of these metals can provide a faster and more efficient neutralization. Bases can be added in either a solid form or as a solution, e.g., an aqueous solution. Representative aqueous solutions can include, but are not limited to, about 25 wt % to about 75 wt % of sodium hydroxide or calcium hydroxide. Mixtures of the above bases can also be used via a simultaneous neutralization reaction, although sequential reaction using different bases in series can also be employed. The amount of base required for neutralization the emulsifier can be determined from a stoichiometric determination or otherwise from direct analysis/monitoring of the acid value prior to and/or during neutralization. The acid value (in mg KOH/g required for neutralization) can be measured, for example, using ASTM D1980-87.

The base can be added gradually over a period of time of about 10 minutes to about 2 hours to reduce or avoid significant temperature deviations due to the heat release upon neutralization. Gradual addition is also suitable in view of the low initial aqueous solubility of the triamide and/or the tall oil, prior to saponification.

The acid value of the neutralized emulsifier can be about 0 mg of KOH, about 1 mg of KOH, or about 2 mg of KOH to about 8 mg of KOH, about 10 mg of KOH, or about 12 mg of, per gram of emulsifier. For example, the emulsifier can have an acid value of about 0 mg of KOH to about 2 mg of KOH, about 1 mg of KOH to about 3 mg of KOH, about 1 mg of KOH to about 5 mg of KOH, about 2 mg of KOH to about 8 mg of KOH, about 9 mg of KOH to about 12 mg of KOH, per gram of emulsifier.

The neutralized emulsifier can have a pH of about 7, about 8, about 9, about 10, about 11, or about 11.5. For example, the neutralized emulsifier can have a pH of about 7.5 to about 8.5, about 8 to about 10, about 9 to about 11, about 9 to about 11.5, or about 8 to about 9.5.

Neutralization with a base can be carried out at a temperature of about 50° C., about 55° C., or about 60° C. to about 85° C., about 90° C., or about 100° C. For example, neutralization can be performed at a temperature of about 60° C. to about 80, about 60° C., about 60° C. to about 75° C., about 65° C. to about 80° C., or about 75° C. to about 100° C.

The emulsifier can be spray dried to produce a spray dried emulsifier. An aqueous diluent can be added to the emulsifier to adjust the viscosity and the solids content. Prior to spray drying, the solids content of the emulsifier can be adjusted to about 35 wt %, about 40 wt %, about 45 wt %, about 50 wt %, or greater, based on the weight of the emulsifier. For example, the solids content of the emulsifier can be about 35 wt % to about 45 wt %, about 40 wt % to about 50 wt %, about 45 wt % to about 50 wt %, based on the weight of the emulsifier prior to spray drying. In some embodiments, sufficient water can be added with the base during neutralization to achieve the desired solids content.

The emulsifier can be fed to the spray drier head, which can be heated (e.g., using natural gas) to provide a spray drier inlet temperature of about 160° C. to about 250° C. The inlet temperature (or simply the "spray drying temperature") can be about 180° C. to about 225° C., where higher temperatures directionally allow for higher throughput of the aqueous composition to be spray dried. Spray drying involves atomization, using an appropriate rotary or nozzle atomizer, of this aqueous composition. Rotary atomization, for example, can often carried out by contacting the solution with a wheel rotating at 30,000-50,000 rpm to produce the required spray. Upon contact of the spray with hot air in the spray dryer chamber, the moisture can be quickly evaporated into an exhaust stream. The resulting solid, free flowing particles of the spray dried emulsifier discharged continuously from the bottom of the conical chamber. The outlet temperature of the spray drier can be about 75° C. to about 100° C. Representative spray dryers include those supplied by Niro, A/S (Soeborg, Denmark).

The spray dried emulsifier can have small particle sizes, which can provide dispersion and solubilization of the spray dried emulsifier in drilling fluids. The particle size populations can fit a normal distribution with an average cross-sectional length or average particle size (e.g., average diameter for spherical particles) of less than 120 µm, less than 100 µm, or less than 80 µm. The average particle size of the particles can be about 10 about 20 µm, or about 30 µm to about 90 µm, about 100 µm, or about 150 µm. For example, the average particle size can be about 10 µm to about 30 µm, about 20 µm to about 50 µm, about 30 µm to about 75 µm, about 70 µm to about 100 µm, about 65 µm to about 85 µm, about 80 µm to about 120 µm, or about 100 µm to about 1,500 µm. In another example, at least 50 wt %, at least 60 wt %, at least 70 wt %, at least 80 wt %, or at least 90 wt % of emulsifier particles can have a particle size of less than 80 microns, based on the total weight of the spray dried emulsifier. The average cross-sectional length or average particle size of the particles can be measured with a light scattering particle size distribution analyzer, such as those manufactured by Horiba Instruments, Inc. (Irvine, Calif.).

The spray dried emulsifier can have a bulk density of about 0.2 g/mL, about 0.3 g/mL, or about 0.4 g/mL to about 0.6 g/mL, about 0.7 g/mL, or about 0.8 g/mL. For example, the bulk density of the spray dried emulsifier can be about 0.2 g/mL to about 0.35 g/mL, about 0.24 g/mL to about 0.56 g/mL, about 0.3 g/mL to about 0.5 g/mL, about 0.4 g/mL to about 0.48 g/mL, or about 0.40 g/mL, to about 0.66 g/mL.

The spray dried emulsifier can have a residual moisture content of less than 10 wt %, less than 7 wt %, less than 5 wt %, less than 3 wt %, or less than 1 wt %, based on the total weight of the spray dried emulsifier. For example, the spray dried emulsifier can have a residual moisture content of about 0.5 wt % to about 3 wt %, about 1 wt % to about 3 wt %, about 2 wt % to about 5 wt %, or about 3 wt % to about 7 wt %, based on the total weight of the spray dried emulsifier.

Silica or other anti-caking or anti-clumping agents can be added to the powder. For example, one or more anti-caking or anti-clumping agents can be added to the spray dried emulsifier in an amount of about 0.1 wt %, about 0.2 wt %, about 0.3 wt %, or about 0.5 wt % to about 1 wt %, about 1.5 wt %, about 2 wt %, or about 3 wt %, based on the combined weight or spray dried emulsifier and the anti-clumping agent. Otherwise, additional drying can be used. The spray dried product can be free flowing and can be stored for extended periods in the absence of exposure to moisture (e.g., in vapor barrier bags) without "re-massing" or significant agglomeration of the solid particles. This is based on oven aging studies of the spray dried emulsifier, used to simulate extended storage at high ambient temperatures. The addition of water to the spray dried emulsifier will can produce or form a basic mixture, having a pH of about 8 to about 11.

The drilling fluids can be prepared by mixing the spray dried emulsifier, a continuous oil-based phase (e.g., maleated tall oil), and a dispersed aqueous phase (e.g., water or an aqueous brine solution). The spray dried emulsifier, the continuous oil-based phase, and the dispersed aqueous phase of the drilling fluid can be mixed or otherwise combined in any order. For example, the spray dried emulsifier can be first dissolved in either the oil phase or the aqueous phase, and the aqueous phase can then be gradually added to the oil phase with vigorous mixing. The converse method (e.g., addition of the oil phase to the aqueous phase) or alternate addition of the two phases can likewise be employed. The drilling fluid can be subjected to high shear condition to provide an emulsion. Any of a wide variety of slow or high speed mixers or agitators, homogenizers, or colloid mills can be used to obtain the degree of contact between the phases, required to disperse the internal aqueous phase in the external oil phase. The amount of emulsifier required to produce a stable emulsion in any given application will depend on the relative proportions of the oil and aqueous phases as well as upon the chemical nature of the respective phases and the particular manner in which the emulsion is prepared.

The drilling fluid can include the spray dried emulsifier at a concentration of about 0.2 wt %, about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, or greater, based on the combined weight of the spray dried emulsifier, the oil phase, and the aqueous phase. For example, the drilling fluid can include the spray dried emulsifier at a concentration of about 0.2 wt % to about 1 wt %, about 0.5 wt % to about 1.5 wt %, about 1 wt % to about 3 wt %, about 2 wt % to about 5 wt %, or about 1 wt % to about 6 wt %, based on the combined weight of the spray dried emulsifier, the oil phase, and the aqueous phase.

The drilling fluid can have an aqueous phase concentration of about 5 wt %, about 10 wt %, about 15 wt %, about 20 wt %, about 25 wt %, about 30 wt %, about 35 wt %, or about 40 wt %, based on the combined weight of the spray dried emulsifier, the oil phase, and the aqueous phase. For example, the drilling fluid can have an aqueous phase concentration of about 5 wt % to about 10 wt %, about 10 wt % to about 20 wt %, about 20 wt % to about 30 wt %, about 30 wt % to about 40 wt %, about 5 wt % to about 40 wt %, about 5 wt % to about 30 wt %, about 5 wt % to about 20 wt %, about 10 wt % to about 40 wt %, or about 10 wt % to about 30 wt %, based on the combined weight of the spray dried emulsifier, the oil phase, and the aqueous phase.

The drilling fluid can have an aqueous phase concentration of about 40 wt %, about 45 wt %, about 50 wt %, about 54 wt %, about 55 wt %, about 60 wt %, about 65 wt %, about 70 wt %, about 75 wt %, about 80 wt %, about 85 wt %, about 95 wt %, based on the combined weight of the spray dried emulsifier, the oil phase, and the aqueous phase. For example, the drilling fluid can have an aqueous phase concentration of about 54 wt % to about 60 wt %, about 55 wt % to about 70 wt %, about 65 wt % to about 85 wt %, or about 80 wt % to about 95 wt %, based on the combined weight of the spray dried emulsifier, the oil phase, and the aqueous phase.

The spray dried emulsifier can be compatible with any of a number of oil bases typically used in invert emulsions, including diesel oil and other hydrocarbons, such as $C_{14}$-$C_{20}$ paraffins, iso-paraffins, olefins, iso-olefins, aromatics, naphthalenes, and other hydrocarbon mixtures including various products of crude oil refining. For the aqueous phase, a brine solution is often used, with representative brine solutions containing sodium chloride, potassium chloride, magnesium chloride, calcium chloride, or any mixtures of these in amounts up to saturation of the aqueous phase. Salt concentrations can be about 20 wt % to about 35 wt % of the aqueous phase. Dissolved salts in the aqueous phase can be used, for example, to increase drilling fluid density, decrease swelling effects of aqueous matter on formation clays, and/or reduce hole enlargement caused by the dissolution of water soluble formation components.

When the emulsion is to contain suspended solids (e.g., a clay) or other additives, these can be added after the emulsion is prepared under high shear conditions, rather than to one phase or the other. Additives can be introduced simultaneously or sequentially, and accompanied by continuous mixing or agitation. For example, a weighting material which increases the density of the drilling fluid can be added. The weighting agent can be any of the high density materials conventionally employed (e.g., barites, whiting, or calcined clay) to achieve a desired density (e.g., about 1.05 g/ml to about 2 g/ml or about 65 lbs/ft$^3$ to about 125 lbs/ft$^3$). Other solid additives can include organoclays, e.g., organophilic clays, that can help suspend drill cuttings. One particular commercial organophilic clay that can be used can be or include the organophilic clay sold under the name VG-Plus sold by M-I Swaco, LLC.

Fluid loss additives, which can serve to increase viscosity and/or reduce the escape of the fluid into permeable formations traversed by the well bore, can be incorporated into the invert emulsion. The amount added should not increase the viscosity of the composition to such an extent that efficient pumping of the drilling fluid is compromised. The fluid loss component additive can be or include a hydratable clay or clay-like material, although asphalt, carbon black, or any conventional additive can be used. High quality clays such as bentonite, montmorillonite, and kaolinite are often employed. Other conventional additives, including filter loss agents, other viscosifiers, wetting agents, stabilizers, gel strength, and/or rheological control agents can be incorporated into the invert emulsion drilling fluid.

EXAMPLES

In order to provide a better understanding of the foregoing discussion, the following non-limiting examples are offered. Although the examples can be directed to specific embodiments, they are not to be viewed as limiting the invention in any specific respect.

Synthesis of Emulsifier C1

A condenser and a Barrett trap were attached to a reaction vessel. To the reaction vessel was added 1,656.2 g of XTOL® 100 (available from Georgia-Pacific Chemicals LLC). The XTOL® 100 was heated to 90° C. under nitrogen for 1 hour. To the XTOL® 100 was slowly added 303.4 g of diethylenetriamine, 7.3 g of triethylenetetramine, and 7.3 g tetraethylenepentamine to form a reaction mixture. The reaction mixture was heated to 160° C. for 4 hours. From the reaction mixture 97 g of distillate was collected in the Barrett trap. The reaction mixture was cooled to 66° C. and 225.9 g maleic anhydride was added in small quantity additions. The temperature of the reaction mixture increased to approximately 85° C. over 105 minutes. The triamide reaction product was obtained in a 93% yield with a final acid value of 61.4 mg KOH/gram of sample, and a total amine value of 20.5 mg KOH/gram of sample. The triamide was a waxy, brown solid, which had a Brookfield viscosity of 75 cP at 140° C. The triamide was then mixed with a modified tall oil product in a ratio of 67 wt % modified tall oil product to 33 wt % of the triamide. The modified tall oil product was a reaction product of tall oil and maleic anhydride, which yielded a 12 wt % maleation. The tall oil for the maleation was 69 wt % of tall oil fatty acids and 31 wt % of rosin acids, based on the combined weight of the tall oil fatty acids and the rosin acids. The mixture of the triamide and modified tall oil product had an acid value of 198.6 mg KOH/gram of sample and a total amine value of 3.5 mg KOH/gram of sample. The mixture of the triamide and modified tall oil product was then heated to 90° C. and neutralized by slowly adding to a pre-mixed solution of 250 grams of tap water and 70.8 grams of 50% sodium hydroxide solution. The final acid number of the neutralized product was adjusted to 0.5 mg KOH/gram of solution with a solids content of 48.9% and a final pH of 11.3. The mixture was adjusted to 21.3 wt % solids, and spray dried on a Niro laboratory spray dryer.

Synthesis of Emulsifier Ex. 1

A condenser and a Barrett trap were attached to a reaction vessel. To the reaction vessel was added 839 g of XTOL® 100 (available from Georgia-Pacific Chemicals LLC). The XTOL® 100 was heated to 90° C. under nitrogen for 1 hour. To the XTOL® 100 was slowly added 153.7 g of diethylenetriamine, 3.7 g of triethylenetetramine, and 3.7 g tetraethylenepentamine to form a reaction mixture. The reaction mixture was heated to 160° C. for 3 hours. From the reaction mixture, 47.1 g of distillate was collected in the Barrett trap. The reaction mixture was cooled to 85° C. and decanted. The isolated amidoamine had a final acid value of 9.9 mg KOH/gram of sample and a total amine value of 106.4 mg KOH/gram of sample. To 188.4 g of the isolated reaction mixture was added 22 g of succinic anhydride. The reaction mixture was heated at 120° C. for 2 hours. The triamide reaction product was a waxy, brown solid obtained in a 93% yield with a final acid value of 51.3 mg KOH/gram of sample and a total amine value of 37.6 mg KOH/gram of sample. The triamide was then mixed with a modified tall oil product in a ratio of 67 wt % modified tall oil product to 33 wt % of the triamide. The modified tall oil product was a reaction product of tall oil and maleic anhydride, which yielded a 12 wt % maleation. The tall oil for the maleation was 69 wt % of tall oil fatty acids and 31 wt % of rosin acids, based on the combined weight of the tall oil fatty acids and the rosin acids. The mixture of the triamide and modified tall oil product had an acid value of 168.8 mg KOH/gram of sample and a total amine value of 9.9 mg KOH/gram of sample. The mixture of the triamide and modified tall oil product was then heated to 90° C. and neutralized by slowly adding to a pre-mixed solution of 150 grams of tap water and 36.1 grams of 50% sodium hydroxide solution. The final acid number of the neutralized product was adjusted to 0.6 mg KOH/gram of solution and a solids content of 50 wt %. This solution was then spray dried on a Niro laboratory spray dryer.

Drilling Fluids for Emulsifiers C1 and Ex. 1

Comparative and inventive drilling fluids were made. The drilling fluids were prepared by combining the ingredients in a Hamilton Beach mixer and then shearing the composition for 5 minutes at 6,000 rpm in a Silverson shear mixer. The compositions for the comparative drilling fluid and the inventive drilling fluid are shown in Table 1.

TABLE 1

Drilling Fluids

| | Comparative Drilling Fluid | Inventive Drilling Fluid | Mix time after addition |
|---|---|---|---|
| #2 Diesel | 180.5 g | 180.5 g | |
| VG-Plus | 6 g | 6 g | 10 minutes |
| Lime | 2 g | 2 g | 5 minutes |
| Emulsifier C1 | 5 g | 0 g | |
| Emulsifier Ex. 1 | 0 g | 5 g | |
| 25 wt % $CaCl_2$ (aq) | 71.5 g | 71.5 g | 10 minutes |
| Barite | 281 g | 281 g | 5 minutes |

Both the comparative drilling fluid and the inventive drilling fluid were of the same compositions except for the triamide used. The comparative drilling fluid used comparative emulsifier (C1). The comparative emulsifier was a spray dried mixture of tall oil and a triamide of Formula (I) except $R^4$ was a $C_2$-alkylene diyl group (e.g., ethylene group). The inventive drilling fluid used emulsifier (Ex. 1), which was a spray dried mixture of tall oil and triamide of Formula (I) where $R^4$ was a $C_2$-alkenylene diyl group (e.g., ethylene diyl group).

The before hot roll (BHR) rheology, plastic viscosity, yield point, electrical stability, and gel strengths for the comparative and inventive drilling fluids were measured. Then, the drilling fluids were hot rolled for 16 hours at 150° F. and the after hot roll (AHR) rheology, plastic viscosity (PV), yield point (YP), electrical stability (ES), ten second gel strength (10"), and ten minute gel strength (10') were measured. The inventive drilling fluid was tested twice. Table 2 shows the results for the rheology tests.

TABLE 2

Rheology Properties

| | Comparative Drilling Fluid | | | Inventive Drilling Fluid (Test 1) | | | Inventive Drilling Fluid (Test 2) | | |
|---|---|---|---|---|---|---|---|---|---|
| Rheology | BHR | AHR 40° F. | AHR 150° F. | BHR | AHR 40° F. | AHR 150° F. | BHR | AHR 40° F. | AHR 150° F. |
| 600 rpm | 50 | 170 | 57 | 54 | 158 | 53 | 50 | 158 | 52 |
| 300 rpm | 30 | 102 | 35 | 33 | 93 | 31 | 29 | 92 | 28 |
| 200 rpm | 23 | 79 | 27 | 25 | 70 | 23 | 21 | 68 | 21 |
| 100 rpm | 16 | 52 | 20 | 18 | 45 | 15 | 15 | 43 | 14 |
| 6 rpm | 8 | 21 | 10 | 9 | 15 | 7 | 7 | 18 | 6 |
| 3 rpm | 7 | 19 | 10 | 8 | 13 | 6 | 6 | 12 | 6 |
| PV | 20 | 68 | 22 | 21 | 65 | 22 | 21 | 66 | 24 |
| YP | 10 | 34 | 13 | 12 | 28 | 9 | 8 | 26 | 4 |
| 10" Gel | 9 | 22 | 11 | 10 | 16 | 8 | 7 | 16 | 7 |
| 10' Gel | 13 | 33 | 15 | 16 | 26 | 15 | 10 | 21 | 10 |

All testing on oil-based drilling fluids was conducted according to the API Recommended Practice Standard 13B-2, Third Edition, February 1998. The rheology data given in Table 2 indicates that the inventive drilling fluids (Tests 1 and 2) show a lower rheological profile at lower rpms (e.g., about 3 rpm to about 6 rpm), lower yield points, and lower gel strengths for the inventive fluids as compared to the comparative drilling fluid.

The electric stability test is an indication of the quality of the invert emulsion. Table 3 shows the results of the electrical stability test.

TABLE 3

Electrical stability

| | Comparative Drilling Fluid | | Inventive Drilling Fluid (Test 1) | | Inventive Drilling Fluid (Test 2) | |
|---|---|---|---|---|---|---|
| | BHR | AHR 150° F. | BHR | AHR 150° F. | BHR | AHR 150° F. |
| ES (Volts at 150° F.) | 752 | 1141 | 837 | 1018 | 701 | 894 |

The electrical stability of the inventive fluids showed similar values before hot roll (BHR) and equivalent or slightly lower electrical stability after hot roll (AHR).

The high temperature/high pressure fluid loss tests were conducted with a 500 psi differential pressure between the top and the bottom of the HTHP cell. The HTHP fluid loss test was performed after hot rolling at a 150° F. The HTHP fluid loss testing was performed at 250° F. As shown in Table 4, the results of the high temperature/high pressure fluid loss testing indicate that the inventive fluids (Tests 1 and 2) have lower fluid loss versus the comparative fluid. These results indicate that the inventive fluids have a lower loss of fluid to the formation, which is highly desirable especially when drilling in sensitive formations.

TABLE 4

High Temperature/High Pressure and Water Loss

| | Comparative Drilling Fluid AHR 150° F. | Inventive Drilling Fluid (Test 1) AHR 150° F. | Inventive Drilling Fluid (Test 2) AHR 150° F. |
|---|---|---|---|
| HT/HP at 250° F. (mL) | 8.2 | 6.0 | 6.0 |
| Water Loss (mL) | 0 | 0 | 0 |

Comparative and inventive drilling fluids were made under contaminated conditions using API Standard Evaluation Clay (API Clay) (See Table 5).

TABLE 5

Drilling Fluids With API Clay

| | Comparative Drilling Fluid | Inventive Drilling Fluid | Mix time after addition |
|---|---|---|---|
| #2 Diesel | 180.5 g | 180.5 g | |
| VG-Plus | 6 g | 6 g | 10 minutes |
| Lime | 2 g | 2 g | 5 minutes |
| Emulsifier C1 | 5 g | 0 g | |
| Emulsifier Ex. 1 | 0 g | 5 g | |
| 25 wt % $CaCl_2$ (aq) | 71.5 g | 71.5 g | 10 minutes |
| Barite | 281 g | 281 g | 5 minutes |
| API Clay | 20 g | 20 g | 5 minutes |

The results of the contamination studies using the API Standard Evaluation Clay are shown in Table 6. The inventive drilling fluid is very effective at maintaining low end (e.g., about 3 rpm to about 6 rpm) rheology while maintaining yield point and gel strengths in the presence of API grade bentonite clay.

TABLE 6

Rheology Properties With API Clay

| Rheology | Comparative Drilling Fluid | | | Inventive Drilling Fluid (Test 1) | | | Inventive Drilling Fluid (Test 2) | | |
|---|---|---|---|---|---|---|---|---|---|
| | BHR | AHR 40° F. | AHR 150° F. | BHR | AHR 40° F. | AHR 150° F. | BHR | AHR 40° F. | AHR 150° F. |
| 600 rpm | 58 | 189 | 59 | 65 | 195 | 64 | 57 | 195 | 62 |
| 300 rpm | 36 | 110 | 34 | 42 | 113 | 38 | 35 | 114 | 36 |
| 200 rpm | 30 | 83 | 28 | 35 | 85 | 30 | 29 | 86 | 28 |
| 100 rpm | 22 | 53 | 20 | 26 | 54 | 21 | 22 | 55 | 19 |
| 6 rpm | 12 | 18 | 10 | 15 | 18 | 10 | 12 | 18 | 9 |
| 3 rpm | 12 | 15 | 9 | 13 | 15 | 9 | 11 | 15 | 8 |
| PV | 22 | 79 | 25 | 23 | 82 | 26 | 22 | 81 | 26 |
| YP | 14 | 31 | 9 | 19 | 31 | 12 | 13 | 33 | 10 |
| 10" Gel | 14 | 18 | 10 | 15 | 18 | 12 | 13 | 18 | 10 |
| 10' Gel | 18 | 25 | 15 | 21 | 25 | 17 | 15 | 27 | 16 |

Table 7 shows the electric stability tests for the comparative and inventive drilling fluids in the presence of clay.

TABLE 7

Electrical Stability With API Clay

| | Comparative Drilling Fluid | | Inventive Drilling Fluid (Test 1) | | Inventive Drilling Fluid (Test 2) | |
|---|---|---|---|---|---|---|
| | BHR | AHR 150° F. | BHR | AHR 150° F. | BHR | AHR 150° F. |
| ES (Volts at 150° F.) | 375 | 588 | 448 | 608 | 572 | 735 |

The electrical stability of the inventive fluids showed similar values before hot roll (BHR) and slightly higher electrical stability values after hot roll (AHR).

Table 8 shows the results of the high temperature/high pressure fluid loss testing indicate that the inventive fluids (Tests 1 and 2) have lower fluid loss versus the comparative fluid in the presence of API grade bentonite clay.

TABLE 8

High Temperature/High Pressure and Water Loss With API Clay

| | Comparative Drilling Fluid AHR 150° F. | Inventive Drilling Fluid (Test 1) AHR 150° F. | Inventive Drilling Fluid (Test 2) AHR 150° F. |
|---|---|---|---|
| HT/HP at 250° F. | 12.0 | 7.6 | 6.6 |
| Water Loss | 0 | 0 | 0 |

Synthesis of Emulsifier C2

A condenser and a Barrett trap were attached to a reaction vessel. To the reaction vessel was added 662.1 g of coconut oil. The coconut oil was heated to 90° C. under nitrogen for 1 hour. To the coconut oil was slowly added 203.6 g of diethylenetriamine to form a reaction mixture. The temperature of the reaction mixture was increased to approximately 120° C. over approximately 30 minutes. The reaction mixture was heated to 130° C. for 4 hours and to 160° C. for an additional 4 hours. The reaction mixture was the cooled to 85° C. and decanted. The isolated amidoamine had a final acid value of 9.9 mg KOH/ gram of sample and a total amine value of 106.4 mg KOH/gram of sample. To 326.1 g of the isolated reaction mixture was added 44 g of maleic anhydride slowly, and the reaction mixture was heated to 70° C. The temperature was increased to approximately 80° C. over approximately 30 minutes. The triamide reaction product was a waxy, brown solid obtained in a 93% yield, and having a final acid value of 70.6 mg KOH/gram of sample and a total amine value of 18.8 mg KOH/gram of sample. The triamide was then mixed with a modified tall oil product in a ratio of 67 wt % modified tall oil product to 33 wt % of the triamide. The modified tall oil product was a reaction product of tall oil and maleic anhydride, which yielded a 12 wt % maleation. The tall oil for the maleation was 69 wt % of tall oil fatty acids and 31 wt % of rosin acids, based on the combined weight of the tall oil fatty acids and the rosin acids. The mixture of the triamide and modified tall oil product had an acid value of 202.1 mg KOH/gram of sample and a total amine value of 5.1 mg KOH/gram of sample. The mixture of the triamide and modified tall oil product was then heated to 90° C. and neutralized by slowly adding a solution of 200 grams of tap water and 57.7 grams of 50% sodium hydroxide solution. The final acid number of the neutralized product was adjusted to 0.8 mg KOH/gram of solution and a solids content of 49.1 wt %. This solution was then spray dried on a Niro laboratory spray dryer.

Synthesis of Emulsifier Ex. 2

The amidoamine product of the inventive emulsifier was made identically as describe above for emulsifier C2. To 348.1 g of the isolated reaction mixture was added 54.7 g of succinic anhydride. The reaction mixture was heated to 130° C. for 2 hours then to 140° C. for 2 hours. The triamide reaction product was a waxy, brown solid obtained in a 93% yield with a final acid value of 42.8 mg KOH/gram of sample and a total amine value of 17.5 mg KOH/gram of sample. The triamide was then mixed with a modified tall oil product in a ratio of 67 wt % modified tall oil product to 33 wt % of the triamide. The modified tall oil product was a reaction product of tall oil and maleic anhydride, which yielded a 12 wt % maleation. The tall oil for the maleation was 69 wt % of tall oil fatty acids and 31 wt % of rosin acids, based on the combined weight of the tall oil fatty acids and the rosin acids. The mixture of the triamide and modified tall oil product was then heated to 90° C. and neutralized by slowly adding a solution of 200 grams of tap water and 57.7 grams of 50% sodium hydroxide solution. The mixture of the triamide and modified tall oil product had an acid value of 188 mg KOH/gram of sample and a total amine value of 5.1 mg KOH/gram of sample.

Drilling Fluids for Emulsifiers C2 and Ex. 2

Comparative and inventive drilling fluids were made with using the emulsifiers containing coconut oil. The drilling fluids were prepared by combining the ingredients in a Hamilton Beach mixer and then shearing the composition for 5 minutes at 6,000 rpm in a Silverson shear mixer. The compositions for the comparative drilling fluid and the inventive drilling fluid are shown in Table 9.

TABLE 9

Drilling Fluids

|  | Comparative Drilling Fluid | Inventive Drilling Fluid | Mix time after addition |
|---|---|---|---|
| #2 Diesel | 180.5 g | 180.5 g |  |
| VG-Plus | 6 g | 6 g | 10 minutes |
| Lime | 2 g | 2 g | 5 minutes |
| Emulsifier C2 | 5 g | 0 g |  |
| Emulsifier Ex. 2 | 0 g | 5 g |  |
| 25 wt % CaCl$_2$ (aq) | 71.5 g | 71.5 g | 10 minutes |
| Barite | 281 g | 281 g | 5 minutes |

Both the comparative drilling fluid and the inventive drilling fluid were of the same compositions except for the triamide used in the emulsifier. The comparative drilling fluid used comparative emulsifier (C2). The comparative emulsifier was a mixture of tall oil and a triamide of Formula (I) except $R^4$ was a C2-alkylene diyl group (e.g., ethylene group). The inventive drilling fluid used emulsifier (Ex. 2), which was a spray dried mixture of tall oil and triamide of Formula (I) where $R^4$ was a C2-alkenylene diyl group (e.g., ethylene diyl group).

The before hot roll rheology, plastic viscosity, yield point, electrical stability, and gel strengths for the comparative and inventive drilling fluids were measured. The drilling fluids were then hot rolled for 16 hours at 40° F. and 150° F. and the after hot roll rheology, plastic viscosity, yield point, electrical stability, ten second minute gel strengths, and ten minute gel strength were measured. Table 10 shows the results for the rheology tests.

TABLE 10

Rheology Properties

| Rheology | Comparative Drilling Fluid | | | Inventive Drilling Fluid | | |
|---|---|---|---|---|---|---|
|  | BHR | AHR 40° F. | AHR 150° F. | BHR | AHR 40° F. | AHR 150° F. |
| 600 rpm | 65 | 177 | 67 | 60 | 164 | 58 |
| 300 rpm | 45 | 110 | 44 | 40 | 96 | 35 |
| 200 rpm | 37 | 84 | 37 | 32 | 72 | 28 |
| 100 rpm | 29 | 56 | 28 | 24 | 46 | 20 |
| 6 rpm | 18 | 20 | 17 | 13 | 15 | 10 |
| 3 rpm | 7 | 18 | 17 | 12 | 13 | 9 |
| PV | 20 | 67 | 23 | 20 | 68 | 23 |
| YP | 25 | 43 | 21 | 20 | 28 | 12 |
| 10" Gel | 17 | 21 | 16 | 12 | 15 | 12 |
| 10' Gel | 20 | 29 | 21 | 14 | 19 | 14 |

Table 11 shows the results of the electrical stability test.

TABLE 11

Electrical Stability

|  | Comparative Drilling Fluid | | Inventive Drilling Fluid | |
|---|---|---|---|---|
|  | BHR | AHR 150° F. | BHR | AHR 150° F. |
| ES (Volts at 150° F.) | 857 | 1160 | 800 | 1051 |

Table 12 shows the results for the high temperature/high pressure water loss test for the comparative drilling fluid using C2 and the inventive drilling fluid using Ex 2.

TABLE 12

High Temperature/High Pressure and Water Loss

|  | Comparative Drilling Fluid AHR 250° F. C | Inventive Drilling Fluid AHR 150° F. |
|---|---|---|
| HT/HP at 250° F. | 9.4 | 8.6 |
| Water Loss | 0 | 0 |

Comparative and inventive drilling fluids were made again with the addition of API grade bentonite clay. The compositions are shown in Table 13.

TABLE 13

Drilling Fluids With API Clay

|  | Comparative Drilling Fluid | Inventive Drilling Fluid | Mix time after addition |
|---|---|---|---|
| #2 Diesel | 180.5 g | 180.5 g |  |
| VG-Plus | 6 g | 6 g | 10 minutes |
| Lime | 2 g | 2 g | 5 minutes |
| Emulsifier C2 | 5 g | 0 g |  |
| Emulsifier Ex. 2 | 0 g | 5 g |  |

TABLE 13-continued

Drilling Fluids With API Clay

| | Comparative Drilling Fluid | Inventive Drilling Fluid | Mix time after addition |
|---|---|---|---|
| 25 wt % CaCl$_2$ (aq) | 71.5 g | 71.5 g | 10 minutes |
| Barite | 281 g | 281 g | 5 minutes |
| API Clay | 20 g | 20 g | 5 minutes |

The before hot roll rheology, plastic viscosity, yield point, electrical stability, and gel strengths for the comparative and inventive drilling fluids were measured. The drilling fluids were then hot rolled for 16 hours at 40° F. and 150° F. and the after hot roll rheology, plastic viscosity, yield point, electrical stability, ten second gel strengths, and ten minute gel strength were measured. The rheology properties of the comparative and inventive drilling fluids are shown in Table 14.

TABLE 14

Rheology Properties With the Addition of API Clay

| | Comparative Drilling Fluid | | | Inventive Drilling Fluid | | |
|---|---|---|---|---|---|---|
| Rheology | BHR | AHR 40° F. | AHR 150° F. | BHR | AHR 40° F. | AHR 150° F. |
| 600 rpm | 73 | 232 | 67 | 63 | 216 | 69 |
| 300 rpm | 51 | 138 | 41 | 41 | 128 | 42 |
| 200 rpm | 42 | 103 | 34 | 32 | 97 | 33 |
| 100 rpm | 32 | 66 | 25 | 23 | 62 | 24 |
| 6 rpm | 20 | 23 | 13 | 13 | 21 | 12 |
| 3 rpm | 19 | 20 | 12 | 1 | 18 | 12 |
| PV | 22 | 94 | 26 | 22 | 88 | 27 |
| YP | 29 | 44 | 15 | 19 | 40 | 15 |
| 10" Gel | 18 | 23 | 15 | 12 | 19 | 12 |
| 10' Gel | 22 | 29 | 17 | 15 | 23 | 16 |

Table 15 shows the results of the electrical stability test for the comparative drilling fluid using C2 and the inventive drilling fluid using Ex 2.

TABLE 15

Electrical Stability With API Clay

| | Comparative Drilling Fluid | | Inventive Drilling Fluid | |
|---|---|---|---|---|
| | BHR | AHR 150° F. | BHR | AHR 150° F. |
| ES (Volts at 150° F.) | 500 | 783 | 508 | 665 |

Table 16 shows the results for the high temperature/high pressure water loss test for the inventive drilling fluid using C2 and the inventive drilling fluid using Ex 2.

TABLE 16

High Temperature/High Pressure and Water Loss With API Clay

| | Comparative Drilling Fluid AHR 150° F. | Inventive Drilling Fluid AHR 150° F. |
|---|---|---|
| HT/HP at 250° F. | 11.4 | 11.6 |
| Water Loss | 0 | 0 |

Synthesis of Emulsifier C3

A condenser and a Barrett trap were attached to a reaction vessel. To the reaction vessel were added 446.5 g of soybean oil and 453.5 g of Tall Oil Fatty Acid. The mixture was heated to 90° C. under nitrogen. To the soybean oil and Tall Oil Fatty Acid mixture was slowly added 163.7 g of diethylenetriamine to make a reaction mixture. The temperature of the reaction mixture was increased to approximately 120° C. over approximately 30 minutes. The reaction mixture was then heated to 130° C. for 2 hours and 160° C. for an additional 4 hours. The reaction mixture was the cooled to 85° C., and decanted. The isolated amidoamine had a final acid value of 11.8 mg KOH/gram of sample and a total amine value of 94.3 mg KOH/gram of sample. To 1,053.6 g of the isolated amidoamine, which was heated to 70° C., was slowly added 188.3 g of maleic anhydride. The reaction mixture increased in temperature to approximately 80° C. over approximately a 30 minute period. The triamide reaction product was a waxy, brown solid obtained in a 93% yield with a final acid value of 64 mg KOH/gram of sample and a total amine value of 21.1 mg KOH/gram of sample. The triamide reaction product was mixed with a modified tall oil product to produce a mixture that had an acid value of 197.3 mg KOH/gram of sample and a total amine value of 6.2 mg KOH/gram of sample. The mixture of the triamide and modified tall oil product (240 g) was heated to 50° C. and neutralized by slowly adding to a solution of 240 grams of tap water and 67.5 grams of 50% sodium hydroxide solution. The final acid number of the neutralized product was adjusted to 0.6 mg KOH/gram of solution and a solids content of 48.8 wt %. This solution was then spray dried on a Niro laboratory spray dryer.

Synthesis of Emulsifier Ex. 3

A condenser and a Barrett trap were attached to a reaction vessel. To the reaction vessel were added 429.4 g of soybean oil and 419.3 g of Tall Oil Fatty Acid. The mixture was heated to 90° C. under nitrogen. To the soybean oil and Tall Oil Fatty Acid blend was slowly added 151.3 g of diethylenetriamine to make a reaction mixture. The temperature of the reaction mixture increased to approximately 120° C. over approximately 30 minutes. The reaction mixture was then heated to 130° C. for 2 hours and to 160° C. for an additional 4 hours. The reaction mixture was cooled to 85° C. and then decanted. The isolated amidoamine had a final acid value of 11.6 mg KOH/ gram of sample and a total amine value of 93.1 mg KOH/gram of sample. To 298.1 g of the isolated reaction mixture heated to 130° C. was added 33.3 g of succinic anhydride. The reaction mixture increased in temperature to approximately 140° C. over approximately a 30 minute period. The triamide reaction product was a waxy, brown solid obtained in a 93% yield with a final acid value of 38.5 mg KOH/gram of sample and a total amine value of 29.5 mg KOH/gram of sample. The triamide was then blended with modified tall oil product in a ratio of 65 wt % modified tall oil product to 35 wt % of carboxyl terminated amidoamine made from tall oil fatty acids. The resulting mixture had an acid value of 184.8 mg KOH/gram of sample and a total amine value of 8.3 mg KOH/gram of sample. The mixture of the triamide and modified tall oil product (200 g) was then heated to 90° C. and neutralized by slowly adding a solution of 200 grams of tap water and 52.7 grams of 50% sodium hydroxide solution. The final acid number of the neutralized product was adjusted to 0.2 mg KOH/gram of solution and a solids content of 48.5 wt %. This solution was then spray dried on a Niro laboratory spray dryer.

Drilling Fluids for Emulsifiers C3 and Ex. 3

The drilling fluids were prepared by combining the ingredients in a Hamilton Beach mixer and then shearing the composition for 5 minutes at 6,000 rpm in a Silverson shear mixer. The compositions for the comparative drilling fluid and the inventive drilling fluid are shown in Table 17.

TABLE 17

Drilling Fluids

|  | Comparative Drilling Fluid | Inventive Drilling Fluid | Mix time after addition |
|---|---|---|---|
| #2 Diesel | 180.5 g | 180.5 g |  |
| VG-Plus | 6 g | 6 g | 10 minutes |
| Lime | 2 g | 2 g | 5 minutes |
| Emulsifier C3 | 5 g | 0 g |  |
| Emulsifier Ex. 3 | 0 g | 5 g |  |
| 25 wt % CaCl$_2$ (aq) | 71.5 g | 71.5 g | 10 minutes |
| Barite | 281 g | 281 g | 5 minutes |

Both the comparative drilling fluid and the inventive drilling fluid were of the same compositions except for the triamide used. The comparative drilling fluid used comparative emulsifier (C3). The comparative emulsifier was a mixture of tall oil and a triamide of Formula (I) except $R^4$ was a $C_2$-alkylene diyl group (e.g., ethylene group). The inventive drilling fluid used emulsifier (Ex. 3), which was a spray dried mixture of tall oil and triamide of Formula (I) where $R^4$ was a $C_2$-alkenylene diyl group (e.g., ethylene diyl group).

The before hot roll rheology, plastic viscosity, yield point, electrical stability, and gel strengths for the comparative and inventive drilling fluids were measured. Then, the drilling fluids were hot rolled for 16 hours at 40° F. and 150° F. and the after hot roll rheology, plastic viscosity, yield point, electrical stability, ten second gel strengths, and ten minute gel strength were measured. Table 18 shows the results for the rheology tests.

TABLE 18

Rheology Properties

|  | Comparative Drilling Fluid | | | Inventive Drilling Fluid | | |
|---|---|---|---|---|---|---|
| Rheology | BHR | AHR 40° F. | AHR 150° F. | BHR | AHR 40° F. | AHR 150° F. |
| 600 rpm | 52 | 197 | 66 | 53 | 195 | 62 |
| 300 rpm | 32 | 119 | 39 | 32 | 115 | 35 |
| 200 rpm | 24 | 90 | 32 | 24 | 87 | 30 |
| 100 rpm | 18 | 58 | 24 | 18 | 55 | 21 |
| 6 rpm | 10 | 19 | 13 | 10 | 18 | 12 |
| 3 rpm | 9 | 17 | 13 | 9 | 15 | 1 |
| PV | 20 | 78 | 27 | 21 | 80 | 27 |
| YP | 12 | 41 | 12 | 11 | 35 | 8 |
| 10" Gel | 10 | 18 | 14 | 11 | 17 | 13 |
| 10' Gel | 11 | 27 | 16 | 12 | 22 | 16 |

The electric stability Table 19 shows the results of the electrical stability test for the comparative drilling fluid using C3 and the inventive drilling fluid using Ex. 3.

TABLE 19

Electrical Stability

|  | Comparative Drilling Fluid | | Inventive Drilling Fluid | |
|---|---|---|---|---|
|  | BHR | AHR 150° F. | BHR | AHR 150° F. |
| ES (Volts at 150° F.) | 833 | 1151 | 824 | 1145 |

Table 20 shows the results for the high temperature/high pressure water loss test for the comparative drilling fluid using C3 and the inventive drilling fluid using Ex 3.

TABLE 20

High Temperature/High Pressure and Water Loss

|  | Comparative Drilling Fluid AHR 150° F. | Inventive Drilling Fluid AHR 150° F. |
|---|---|---|
| HT/HP at 250° F. | 10.2 | 8.2 |
| Water Loss | 0 | 0 |

Comparative and inventive drilling fluids were made again with the addition of API grade bentonite clay. The compositions are shown in Table 21.

TABLE 21

Drilling Fluids With API Clay

|  | Comparative Drilling Fluid | Inventive Drilling Fluid | Mix time after addition |
|---|---|---|---|
| #2 Diesel | 180.5 g | 180.5 g |  |
| VG-Plus | 6 g | 6 g | 10 minutes |
| Lime | 2 g | 2 g | 5 minutes |
| Emulsifier C3 | 5 g | 0 g |  |
| Emulsifier Ex. 3 | 0 g | 5 g |  |
| 25 wt % CaCl$_2$ (aq) | 71.5 g | 71.5 g | 10 minutes |
| Barite | 281 g | 281 g | 5 minutes |
| API Clay | 20 g | 20 g | 5 minutes |

The before hot roll rheology, plastic viscosity, yield point, electrical stability, and gel strengths for the comparative and inventive drilling fluids were measured. The drilling fluids were then hot rolled for 16 hours at 40° F. and 150° F., and the after hot roll rheology, plastic viscosity, yield point, electrical stability, ten second gel strengths, and ten minute gel strength were measured. Table 22 shows the results for the rheology tests.

TABLE 22

Rheology Properties with the addition of API Clay

|  | Comparative Drilling Fluid | | | Inventive Drilling Fluid | | |
|---|---|---|---|---|---|---|
| Rheology | BHR | AHR 40° F. | AHR 150° F. | BHR | AHR 40° F. | AHR 150° F. |
| 600 rpm | 61 | 221 | 66 | 63 | 242 | 73 |
| 300 rpm | 38 | 130 | 39 | 39 | 143 | 43 |
| 200 rpm | 31 | 96 | 32 | 31 | 107 | 35 |
| 100 rpm | 23 | 60 | 24 | 23 | 68 | 25 |
| 6 rpm | 13 | 20 | 13 | 12 | 21 | 13 |
| 3 rpm | 12 | 18 | 12 | 11 | 18 | 12 |
| PV | 23 | 91 | 27 | 24 | 99 | 30 |
| YP | 15 | 39 | 12 | 15 | 44 | 13 |

TABLE 22-continued

Rheology Properties with the addition of API Clay

|  | Comparative Drilling Fluid | | | Inventive Drilling Fluid | | |
| --- | --- | --- | --- | --- | --- | --- |
| Rheology | BHR | AHR 40° F. | AHR 150° F. | BHR | AHR 40° F. | AHR 150° F. |
| 10" Gel | 13 | 20 | 14 | 12 | 19 | 14 |
| 10' Gel | 17 | 27 | 18 | 15 | 26 | 18 |

Table 23 shows the results of the electrical stability test for the comparative drilling fluid using C3 and the inventive drilling fluid using Ex 3.

TABLE 23

Electrical stability

|  | Comparative Drilling Fluid | | Inventive Drilling Fluid | |
| --- | --- | --- | --- | --- |
|  | BHR | AHR 150° F. | BHR | AHR 150° F. |
| ES (Volts at 150° F.) | 464 | 683 | 549 | 870 |

Table 24 shows the results for the high temperature/high pressure water loss test for the comparative drilling fluid using C3 and the inventive drilling fluid using Ex 3.

TABLE 24

High Temperature/High Pressure and Water Loss

|  | Comparative Drilling Fluid AHR 150° F. | Inventive Drilling Fluid AHR 150° F. |
| --- | --- | --- |
| HT/HP at 250° F. | 10.8 | 10.8 |
| Water Loss | 0 | 0 |

Synthesis of Emulsifier C4

A condenser and a Barrett trap were attached to a reaction vessel. To the reaction vessel were added 502.2 g of Palm Olein and 512.3 g of Tall Oil Fatty Acid. The mixture was heated to 90° C. under nitrogen. To the soybean oil and Tall Oil Fatty Acid mixture was slowly added 185.5 g of diethylenetriamine. The temperature of the reaction mixture increased to approximately 120° C. over approximately 30 minutes. The reaction mixture was then heated to 130° C. for 2 hours and to 160° C. for an additional 4 hours. The reaction mixture was cooled to 85° C. and decanted. The isolated amidoamine had a final acid value of 11.7 mg KOH/gram of sample and a total amine value of 117.5 mg KOH/gram of sample. To 350 g of the isolated reaction mixture, which was heated to 70° C., was added 41.7 g of maleic anhydride. The reaction mixture increased in temperature to approximately 90° C. over 30 minutes. The triamide reaction product was a waxy, brown solid obtained in a 93% yield with a final acid value of 50 mg KOH/gram of sample and a total amine value of 22.7 mg KOH/gram of sample. The triamide was then mixed with a modified tall oil product in a ratio of 65 wt % modified tall oil product to 35 wt % of the carboxyl terminated amidoamine. The mixture of the triamide and the modified tall oil product had an acid value of 197.2 mg KOH/gram of sample and a total amine value of 6.7 mg KOH/gram of sample. The mixture of the triamide and the modified tall oil product (200 g) of the mixture was heated to 50° C. and neutralized by slowly adding a solution of 200 grams of tap water and 56.3 grams of 50% sodium hydroxide solution. The final acid number of the neutralized product was adjusted to 0.3 mg KOH/gram of solution and a solids content of 48.9 wt %. This solution was then spray dried on a Niro laboratory spray dryer.

Synthesis of Emulsifier Ex. 4

A condenser and a Barrett trap were attached to a reaction vessel. To the reaction vessel were added 502.2 g of Palm Olein and 512.3 g of Tall Oil Fatty Acid to form a mixture. The mixture was heated to 90° C. under nitrogen. To the soybean oil and Tall Oil Fatty Acid mixture was slowly added 185.5 g of diethylenetriamine to form a reaction mixture. The temperature of the reaction mixture increased to approximately 120° C. for 30 minutes. The reaction mixture was then heated to 130° C. for 2 hours and then to 160° C. for approximately 4 hours. The reaction mixture was cooled to 85° C. and decanted. The isolated amidoamine had a final acid value of 11.7 mg KOH/gram of sample and a total amine value of 117.5 mg KOH/gram of sample. To 350 g of the isolated reaction mixture, which was heated to 125° C., was slowly added 42.6 g of succinic anhydride. The reaction mixture increased in temperature to approximately 137° C. over approximately a 30 minute period. The triamide reaction product was a waxy, brown solid obtained in a 93% yield with a final acid value of 52.4 mg KOH/gram of sample and a total amine value of 30 mg KOH/gram of sample. The triamide was then mixed with a modified tall oil product in a ratio of 65 wt % modified tall oil product to 35 wt % of carboxyl terminated amidoamine. The mixture of the triamide and the modified tall oil product had an acid value of 180 mg KOH/gram of sample and a total amine value of 10 mg KOH/gram of sample. The mixture of the triamide and the modified tall oil product (200 g) of the mixture was heated to 50° C. and neutralized by slowly adding a solution of 200 grams of tap water and 51.4 grams of 50% sodium hydroxide solution. The final acid number of the neutralized product was adjusted to 0.2 mg KOH/gram of solution and a solids content of 49.1%. This solution was then spray dried on a Niro laboratory spray dryer.

The drilling fluids were prepared by combining the ingredients in a Hamilton Beach mixer and then shearing the composition for 5 minutes at 6,000 rpm in a Silverson shear mixer. The compositions for the comparative drilling fluid and the inventive drilling fluid are shown in Table 25.

TABLE 25

Drilling Fluids

|  | Comparative Drilling Fluid | Inventive Drilling Fluid | Mix time after addition |
| --- | --- | --- | --- |
| #2 Diesel | 180.5 g | 180.5 g |  |
| VG-Plus | 6 g | 6 g | 10 minutes |
| Lime | 2 g | 2 g | 5 minutes |
| Emulsifier C4 | 5 g | 0 g |  |
| Emulsifier Ex. 4 | 0 g | 5 g |  |
| 25 wt % CaCl$_2$ (aq) | 71.5 g | 71.5 g | 10 minutes |
| Barite | 281 g | 281 g | 5 minutes |

Both the comparative drilling fluid and the inventive drilling fluid were of the same compositions except for the triamide used. The comparative drilling fluid used comparative emulsifier (C4). The comparative emulsifier was a mixture of tall oil and a triamide of Formula (I) except $R^4$ was a $C_2$-alkylene diyl group (e.g., ethylene group). The inventive drilling fluid used emulsifier (Ex. 4), which was a spray dried mixture of tall oil and triamide of Formula (I) where $R^4$ was a $C_2$-alkenylene diyl group (e.g., ethylene diyl group).

The before hot roll rheology, plastic viscosity, yield point, electrical stability, and gel strengths for the comparative and inventive drilling fluids were measured. Then, the drilling fluids were hot rolled for 16 hours at 40° F. and 150° F. and the after hot roll rheology, plastic viscosity, yield point, electrical stability, ten second gel strengths, and ten minute gel strength were measured. Table 26 shows the results for the rheology tests.

TABLE 26

Rheology Properties

| Rheology | Comparative Drilling Fluid | | | Inventive Drilling Fluid | | |
| --- | --- | --- | --- | --- | --- | --- |
| | BHR | AHR 40° F. | AHR 150° F. | BHR | AHR 40° F. | AHR 150° F. |
| 600 rpm | 54 | 220 | 70 | 52 | 188 | 64 |
| 300 rpm | 34 | 136 | 45 | 31 | 113 | 39 |
| 200 rpm | 25 | 105 | 37 | 24 | 86 | 31 |
| 100 rpm | 18 | 70 | 28 | 18 | 56 | 22 |
| 6 rpm | 10 | 25 | 17 | 9 | 19 | 13 |
| 3 rpm | 9 | 23 | 16 | 9 | 17 | 12 |
| PV | 20 | 84 | 25 | 21 | 75 | 25 |
| YP | 14 | 52 | 20 | 10 | 38 | 14 |
| 10" Gel | 7 | 24 | 16 | 9 | 19 | 14 |
| 10' Gel | 10 | 34 | 19 | 10 | 24 | 16 |

Table 27 shows the results of the electrical stability test for the comparative drilling fluid using C4 and the inventive drilling fluid using Ex 4.

TABLE 27

Electrical stability

| | Comparative Drilling Fluid | | Inventive Drilling Fluid | |
| --- | --- | --- | --- | --- |
| | BHR | AHR 150° F. | BHR | AHR 150° F. |
| ES (Volts at 150° F.) | 770 | 1203 | 764 | 1170 |

Table 28 shows the results for the high temperature/high pressure water loss test for the comparative drilling fluid using C4 and the inventive drilling fluid using Ex 4.

TABLE 28

High Temperature/High Pressure and Water Loss

| | Comparative Drilling Fluid AHR 150° F. | Inventive Drilling Fluid AHR 150° F. |
| --- | --- | --- |
| HT/HP at 250° F. | 12.2 | 11.0 |
| Water Loss | 0.4 | 0.4 |

Comparative and inventive drilling fluids were made again with the addition of API grade bentonite clay. The compositions are shown in Table 29.

TABLE 29

Drilling Fluids With API Clay

| | Comparative Drilling Fluid | Inventive Drilling Fluid | Mix time after addition |
| --- | --- | --- | --- |
| #2 Diesel | 180.5 g | 180.5 g | |
| VG-Plus | 6 g | 6 g | 10 minutes |
| Lime | 2 g | 2 g | 5 minutes |
| Emulsifier C4 | 5 g | 0 g | |
| Emulsifier Ex. 4 | 0 g | 5 g | |
| 25 wt % $CaCl_2$ (aq) | 71.5 g | 71.5 g | 10 minutes |
| Barite | 281 g | 281 g | 5 minutes |
| API Clay | 20 g | 20 g | 5 minutes |

The before hot roll rheology, plastic viscosity, yield point, electrical stability, and gel strengths for the comparative and inventive drilling fluids were measured. The drilling fluids were then hot rolled for 16 hours at 40° F. and 150° F., and the after hot roll rheology, plastic viscosity, yield point, electrical stability, ten second gel strengths, and ten minute gel strength were measured. Table 30 shows the results for the rheology tests.

TABLE 30

Rheology Properties With API Clay

| Rheology | Comparative Drilling Fluid | | | Inventive Drilling Fluid | | |
| --- | --- | --- | --- | --- | --- | --- |
| | BHR | AHR 40° F. | AHR 150° F. | BHR | AHR 40° F. | AHR 150° F. |
| 600 rpm | 54 | 249 | 69 | 57 | 217 | 75 |
| 300 rpm | 32 | 147 | 42 | 33 | 132 | 47 |
| 200 rpm | 26 | 110 | 34 | 25 | 102 | 38 |
| 100 rpm | 19 | 70 | 25 | 18 | 69 | 28 |
| 6 rpm | 10 | 25 | 14 | 9 | 26 | 16 |
| 3 rpm | 10 | 21 | 12 | 9 | 23 | 15 |
| PV | 22 | 102 | 27 | 24 | 85 | 28 |
| YP | 10 | 45 | 15 | 9 | 47 | 19 |
| 10" Gel | 10 | 21 | 14 | 10 | 22 | 17 |
| 10' Gel | 13 | 27 | 18 | 11 | 29 | 21 |

Table 31 shows the results of the electrical stability test for the comparative drilling fluid using C4 and the inventive drilling fluid using Ex 4.

TABLE 31

Electrical Stability With API Clay

| | Comparative Drilling Fluid | | Inventive Drilling Fluid | |
| --- | --- | --- | --- | --- |
| | BHR | AHR 150° F. | BHR | AHR 150° F. |
| ES (Volts at 150° F.) | 391 | 600 | 360 | 551 |

Table 32 shows the results for the high temperature/high pressure water loss test for the comparative drilling fluid using C4 and the inventive drilling fluid using Ex 4.

TABLE 32

High Temperature/High Pressure and Water Loss With API Clay

| | Comparative Drilling Fluid AHR 150° F. | Inventive Drilling Fluid AHR 150° F. |
|---|---|---|
| HT/HP at 250° F. | 14.8 | 14.6 |
| Water Loss | 0.2 | 0.2 |

Embodiments of the present disclosure further relate to any one or more of the following paragraphs:

1. A method for making an emulsifier, comprising: mixing a tall oil and a triamide, wherein the triamide has the chemical formula:

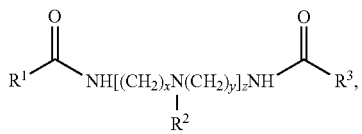

wherein:
x, y, and z are integers independently selected from 1 to 10,
$R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl,
$R^2$ is H or

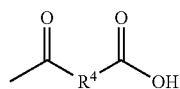

independently selected for each $[(CH_2)_xNR^2(CH_2)_y]$ unit, wherein $R^4$ is a $C_1$-$C_3$ alkylene or a $C_1$-$C_3$ alkylene alcohol, and wherein at least one $R^2$ is

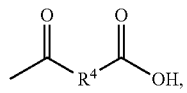

and
$R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

2. The method according to paragraph 1, wherein the mixture has a triamide to tall oil weight ratio of about 1:4 to about 2:3.

3. The method according to paragraph 1 or 2, wherein $R^4$ is an ethanediyl group (—$CH_2CH_2$—).

4. The method according to any one of paragraphs 1 to 3, further comprising spray drying the mixture to produce a spray dried emulsifier having an average particle size of about 1 μm to about 75 μm.

5. The method according to any one of paragraphs 1 to 4, wherein the emulsifier is at least partially neutralized before spray drying.

6. The method according to any one of paragraphs 1 to 5, wherein the mixture is diluted with an aqueous diluent to provide a solids content of about 35 wt % to about 50 wt %, based on the weight of the emulsifier prior to spray drying.

7. The method according to any one of paragraphs 1 to 6, wherein the spray dried emulsifier has an average particle size of about 30 μm to about 75 μm.

8. The method according to any one of paragraphs 1 to 7, wherein the spray dried emulsifier has a bulk density of about 0.24 g/mL to about 0.56 g/mL.

9. The method according to any one of paragraphs 1 to 8, wherein the tall oil comprises crude tall oil, distillate tall oil, tall oil bottoms, or any mixture thereof.

10. The method according to any one of paragraphs 1 to 9, wherein the tall oil comprises is a reaction product of at least tall oil and an α, β unsaturated carboxylic acid or an α,β unsaturated acid anhydride.

11. The method according to any one of paragraphs 1 to 10, wherein the tall oil is a Diels-Alder product, an ene product, or any mixture thereof.

12. The method according to any one of paragraphs 1 to 11, wherein the Diels-Alder product, the ene product, or the mixture thereof is oxidized to provide an ether bond between at least two or more hydrocarbon backbones.

13. The method according to any one of paragraphs 1 to 12, wherein the tall oil is dimerized by a carbon-carbon bond between at least two or more hydrocarbon backbones.

14. The method according to any one of paragraphs 1 to 13, wherein the tall oil is oxidized to provide an ether bond between at least two or more hydrocarbon backbones.

15. The method according to any one of paragraphs 1 to 14, wherein the tall oil comprises a mixture of a first tall oil distillate fraction and a second tall oil distillate fraction comprising about 45 wt % to about 90 wt % of fatty acids and about 10 wt % to about 55 wt % of rosin acids, based on the combined weight of the first tall oil distillate fraction and the second tall oil distillate fraction.

16. A method for making an emulsifier, comprising: mixing a triamide and a tall oil, wherein the triamide is prepared by reacting a diamidoamine with a saturated dicarboxylic acid, a saturated acid anhydride, or a mixture thereof; and spray drying the mixture to provide a spray dried emulsifier.

17. The method according to paragraph of 16, wherein the mixture has a triamide to tall oil weight ratio of about 1:4 to about 2:3.

18. The method according to paragraph 16 or 17, wherein the saturated dicarboxylic acid is succinic acid or the saturated anhydride is succinic anhydride.

19. The method according to any one of paragraphs of 16 to 18, wherein the saturated dicarboxylic acid is glutaric acid or the saturated anhydride is glutaric anhydride.

20. The method according to any one of paragraphs of 16 to 19, wherein the diamidoamine is a reaction product from one or more fatty acids and one or more polyamines.

21. The method according to any one of paragraphs of 16 to 20, wherein the one or more polyamine has the formula $H_2[(CH_2)_xNH]_yH$, wherein x and y are integers independently selected from 1 to 10.

22. The method according to any one of paragraphs of 16 to 21, wherein emulsifier is at least partially neutralized before spray drying.

23. The method according to any one of paragraphs of 16 to 22, wherein the emulsifier has, or is diluted with an aqueous diluent to provide, a solids content of about 35 wt % to about 50 wt %, based on the weight of the emulsifier prior to spray drying.

24. The method according to any one of paragraphs of 16 to 23, wherein the tall oil comprises crude tall oil, distillate tall oil, tall oil bottoms, or any mixture thereof.

25. The method according to any one of paragraphs of 16 to 24, wherein the tall oil comprises a mixture of a first tall oil distillate fraction and a second tall oil distillate fraction comprising about 45 wt % to about 90 wt % of fatty acids and about 10 wt % to about 55 wt % of rosin acids, based on the combined weight of the first tall oil distillate fraction and the second tall oil distillate fraction.

26. The method according to any one of paragraphs of 16 to 25, wherein the tall oil comprises is a reaction product of at least tall oil and an α,β unsaturated carboxylic acid or an α,β unsaturated acid anhydride.

27. The method according to any one of paragraphs of 16 to 26, wherein the tall oil is a Diels-Alder product, an Alder-ene product, or any mixture thereof.

28. The method according to any one of paragraphs of 16 to 27, wherein the Diels-Alder product, the ene product, or the mixture thereof is oxidized to provide an ether bond between at least two or more hydrocarbon backbones.

29. The method according to any one of paragraphs of 16 to 28, wherein the tall oil is dimerized by a carbon-carbon bond between at least two or more hydrocarbon backbones.

30. The method according to any one of paragraphs of 16 to 29, wherein the tall oil is oxidized to provide an ether bond between at least two or more hydrocarbon backbones.

31. A method for making a drilling fluid, comprising: mixing an oil phase, an aqueous phase, and a spray dried emulsifier to produce a drilling fluid, wherein the spray dried emulsifier comprises a mixture of a tall oil and a triamide, wherein the triamide has the chemical formula:

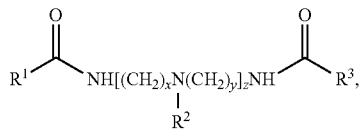

wherein:
x, y, and z are integers independently selected from 1 to 10,
$R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl,
$R^2$ is H or

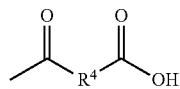

independently selected for each $[(CH_2)_xNR^2(CH_2)_y]$ unit, wherein $R^4$ is a $C_1$-$C_3$ alkylene or a $C_1$-$C_3$ alkylene alcohol, and wherein at least one $R^2$ is

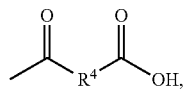

and
$R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

32. The method according to paragraph 31, wherein the spray dried emulsifier is present in the drilling fluid in an amount of about 1 wt % to about 5 wt %, based on the weight of the oil phase, the aqueous phase, and the spray dried emulsifier.

33. The method according to paragraph 31 or 32, wherein $R^4$ is an ethanediyl group (—$CH_2CH_2$—).

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:
1. An emulsifier, comprising:
a tall oil component; and
a triamide component comprising a triamide having the chemical formula:

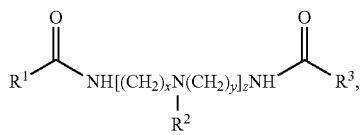

wherein:
x, y, and z are integers independently selected from 1 to 10,
$R^1$ is a $C_8$-$C_{20}$ alkyl, a $C_8$-$C_{20}$ alkenyl, a $C_8$-$C_{20}$ dialkenyl, or a $C_8$-$C_{20}$ alkynyl,
$R^2$ is H or

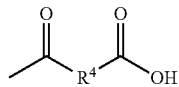

independently selected for each $[(CH_2)_xNR^2(CH_2)_y]$ unit, wherein $R^4$ is a $C_1$-$C_3$ alkylene or a $C_1$-$C_3$ alkylene alcohol, and wherein at least one $R^2$ is

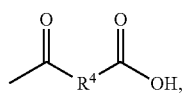

and
$R^3$ is a $C_8$-$C_{20}$ alkyl, a $C_8$-$C_{20}$ alkenyl, a $C_8$-$C_{20}$ dialkenyl, or a $C_8$-$C_{20}$ alkynyl.

2. The emulsifier of claim 1, wherein the triamide component comprises an alkali metal salt of the triamide, an alkaline earth metal salt of the triamide, or a mixture thereof.

3. The emulsifier of claim 1, wherein the triamide component comprises an alkali metal salt of the triamide.

4. The emulsifier of claim 3, wherein $R^4$ is an ethanediyl group (—$CH_2CH_2$—).

5. The emulsifier of claim 1, wherein the triamide component comprises an alkaline earth metal salt of the triamide.

6. The emulsifier of claim 5, wherein $R^4$ is an ethanediyl group (—$CH_2CH_2$—).

7. The emulsifier of claim 1, wherein the tall oil component comprises a tall oil.

8. The emulsifier of claim 1, wherein the tall oil component comprises an alkali metal salt of a tall oil.

9. The emulsifier of claim 1, wherein the tall oil component comprises an alkaline earth metal salt of a tall oil.

10. The emulsifier of claim 1, wherein the emulsifier is a spray dried emulsifier and has an average particle size of about 1 μm to about 75 μm.

11. The emulsifier of claim 1, wherein the tall oil comprises a crude tall oil, a distillate tall oil, a tall oil bottoms, or a mixture thereof.

12. The emulsifier of claim 1, wherein the tall oil component comprises a modified tall oil produced by reacting a tall oil and an α,β unsaturated carboxylic acid or an α,β unsaturated acid anhydride.

13. The emulsifier of claim 1, wherein the tall oil component comprises a mixture of a first tall oil distillate fraction and a second tall oil distillate fraction comprising about 45 wt % to about 90 wt % of fatty acids and about 10 wt % to about 55 wt % of rosin acids, based on the combined weight of the first tall oil distillate fraction and the second tall oil distillate fraction.

14. A process for making an emulsifier of claim 1, the method comprising: mixing the tall oil component and the triamide component to produce a mixture; and spray drying the mixture to produce a spray dried emulsifier.

15. The process of claim 14, wherein the triamide component is produced by reacting a diamidoamine with a saturated dicarboxylic acid, a saturated acid anhydride, or a mixture thereof, and wherein the tall oil component is produced by reacting a tall oil and an α,β unsaturated carboxylic acid or an α,β unsaturated acid anhydride.

16. The process of claim 14, further comprising neutralizing the mixture to produce a neutralized mixture, wherein the neutralized mixture is spray dried to produce the spray dried emulsifier.

17. A drilling fluid, comprising: an oil phase; an aqueous phase, and the spray dried emulsifier of claim 14.

18. The drilling fluid of claim 17, wherein: the oil phase comprises paraffins, olefins, aromatics, naphthalenes, or a mixture thereof, the aqueous phase comprises a brine solution containing sodium chloride, potassium chloride, magnesium chloride, calcium chloride, or a mixture thereof, the triamide component comprises an alkali metal salt of a triamide, an alkaline earth metal salt of a triamide, or a mixture thereof, and the tall oil component comprises an alkali metal salt of a tall oil, an alkaline earth metal salt of a tall oil, or a mixture thereof.

19. The drilling fluid of claim 18, wherein the drilling fluid comprises about 0.2 wt % to about 5 wt % of the spray dried emulsifier and about 5 wt % to about 40 wt % of the aqueous phase, based on a combined weight of the oil phase, the aqueous phase, and the spray dried emulsifier.

20. The process of claim 15, wherein:
the saturated dicarboxylic acid includes at least one of succinic acid, malic acid, and glutaric acid; or
the saturated acid anhydride includes at least one of succinic anhydride and glutaric anhydride.

* * * * *